US012785896B2

(12) United States Patent
Guo et al.

(10) Patent No.: US 12,785,896 B2
(45) Date of Patent: Nov. 3, 2026

(54) RESOURCE CONFIGURATION METHOD, APPARATUS AND STORAGE MEDIUM

(71) Applicant: Beijing Xiaomi Mobile Software Co., Ltd., Beijing (CN)

(72) Inventors: Shengxiang Guo, Beijing (CN); Xueyuan Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 298 days.

(21) Appl. No.: 18/696,098

(22) PCT Filed: Sep. 29, 2021

(86) PCT No.: PCT/CN2021/121715

§ 371 (c)(1),
(2) Date: Mar. 27, 2024

(87) PCT Pub. No.: WO2023/050151

PCT Pub. Date: Apr. 6, 2023

(65) Prior Publication Data

US 2024/0397308 A1 Nov. 28, 2024

(51) Int. Cl.

*H04L 5/00* (2006.01)
*H04B 7/0404* (2017.01)
*H04B 7/06* (2006.01)

(52) U.S. Cl.

CPC ......... *H04L 5/0051* (2013.01); *H04B 7/0404* (2013.01); *H04B 7/0628* (2013.01); *H04L 5/0023* (2013.01); *H04L 5/0094* (2013.01)

(58) Field of Classification Search

CPC ...... H04W 8/22; H04W 76/20; H04L 5/0051; H04L 5/0023; H04L 5/0094; H04B 7/0404; H04B 7/0628

See application file for complete search history.

(56) References Cited

U.S. PATENT DOCUMENTS

| | | | | |
|---|---|---|---|---|
| 2020/0382252 | A1 | 12/2020 | Sun | |
| 2021/0167914 | A1* | 6/2021 | Kwak | .................. H04W 72/23 |
| 2022/0116979 | A1 | 4/2022 | Park et al. | |

(Continued)

FOREIGN PATENT DOCUMENTS

| | | | |
|---|---|---|---|
| CN | 109803253 | A | 5/2019 |
| CN | 111510269 | A | 8/2020 |

(Continued)

OTHER PUBLICATIONS

Extended European Search Report Issued in Application No. 21958741.7 dated Oct. 24, 2024, 100 pages.

(Continued)

*Primary Examiner* — Michael K Phillips

(74) *Attorney, Agent, or Firm* — Finnegan, Henderson, Farabow, Garrett & Dunner, L.L.P.

(57) ABSTRACT

A resource configuration method is performed by a network side device. The method includes: receiving an antenna capability reported by a terminal, wherein the antenna capability includes that a maximum number of layers for transmission is greater than two layers; and configuring at least one Sounding Reference Signal (SRS) resource set for the terminal according to the antenna capability reported by the terminal including that the maximum number of layers for transmission is greater than two layers.

16 Claims, 14 Drawing Sheets

(56) References Cited

U.S. PATENT DOCUMENTS

| | | | |
|---|---|---|---|
| 2023/0087859 A1* | 3/2023 | Shahmohammadian .................... H04L 5/0048 370/329 | |
| 2023/0147639 A1 | 5/2023 | Go et al. | |

FOREIGN PATENT DOCUMENTS

| | | | |
|---|---|---|---|
| CN | 112564871 A | 3/2021 | |
| WO | WO 2020/143805 A1 | 7/2020 | |
| WO | WO 2020/162716 A1 | 8/2020 | |
| WO | WO 2021/187967 A1 | 9/2021 | |

OTHER PUBLICATIONS

Qualcomm Incorporated, "Discussion on SRS enhancement," 3GPP TSG-RAN WG1 Meeting #104bis-e, R1-2103155, e-Meeting, Apr. 12-20, 2021, 28 pages.

International Search Report of International Application No. PCT/CN2021/121715, dated Jun. 21, 2022, 4 pages.

* cited by examiner

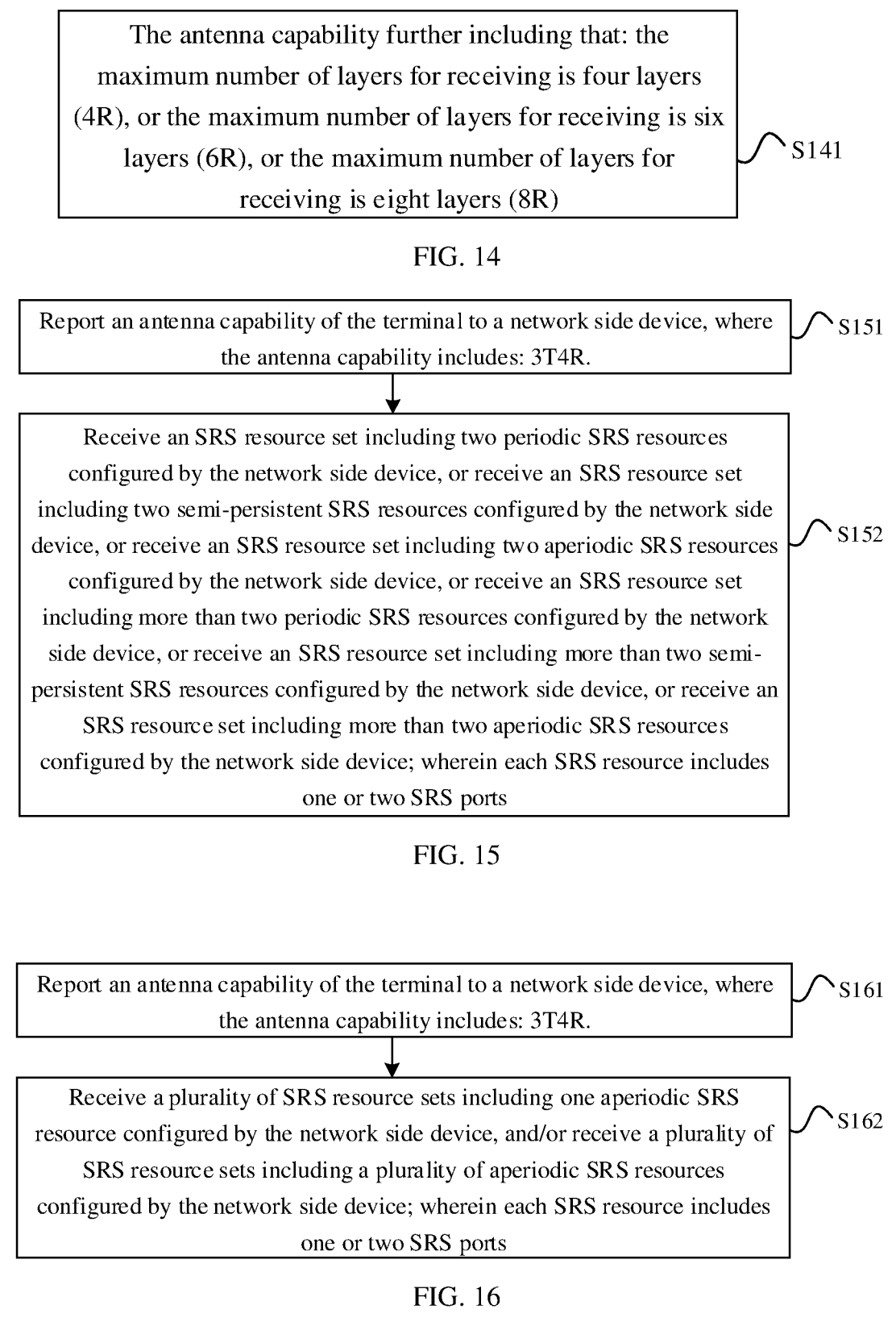

S141: The antenna capability further including that: the maximum number of layers for receiving is four layers (4R), or the maximum number of layers for receiving is six layers (6R), or the maximum number of layers for receiving is eight layers (8R)

FIG. 14

S151: Report an antenna capability of the terminal to a network side device, where the antenna capability includes: 3T4R.

↓

S152: Receive an SRS resource set including two periodic SRS resources configured by the network side device, or receive an SRS resource set including two semi-persistent SRS resources configured by the network side device, or receive an SRS resource set including two aperiodic SRS resources configured by the network side device, or receive an SRS resource set including more than two periodic SRS resources configured by the network side device, or receive an SRS resource set including more than two semi-persistent SRS resources configured by the network side device, or receive an SRS resource set including more than two aperiodic SRS resources configured by the network side device; wherein each SRS resource includes one or two SRS ports

FIG. 15

S161: Report an antenna capability of the terminal to a network side device, where the antenna capability includes: 3T4R.

↓

S162: Receive a plurality of SRS resource sets including one aperiodic SRS resource configured by the network side device, and/or receive a plurality of SRS resource sets including a plurality of aperiodic SRS resources configured by the network side device; wherein each SRS resource includes one or two SRS ports

FIG. 16

In a case where the antenna capability reported by the terminal includes 3T4R, the terminal including four antennas; two of the four antennas each using one radio frequency channel to send SRS information, and the remaining two antennas sharing one radio frequency channel to send the SRS information through switching

S221

FIG. 22

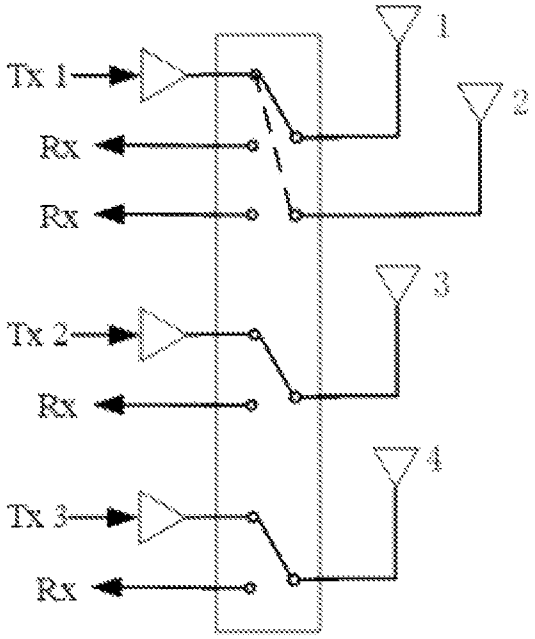

FIG. 23

In a case where the antenna capability reported by the terminal includes 3T6R, the terminal including six antennas; every two antennas among the six antennas sharing one radio frequency channel to send SRS information through switching

S241

FIG. 24

In a case where the antenna capability reported by the terminal includes 3T8R, the terminal including eight antennas, and the eight antennas being divided into three antenna groups, each antenna group including at least two antennas, and at least two antennas in each antenna group sharing one radio frequency channel to send SRS information through switching.

S261

RESOURCE CONFIGURATION METHOD, APPARATUS AND STORAGE MEDIUM

CROSS REFERENCE TO RELATED APPLICATION

The present application is a U.S. national stage application of International Application No. PCT/CN2021/121715, filed on Sep. 29, 2021, the content of which is incorporated herein by reference in its entirety.

TECHNICAL FIELD

The present disclosure relates to the field of communication technologies, and in particular, to a resource configuration method, an apparatus and a storage medium.

BACKGROUND

In the New Radio (NR) system, a network side device is supported to obtain downlink channel information through channel reciprocity to improve downlink data transmission performance. In order to support a network side device to effectively obtain downlink information through the channel reciprocity under various terminal transmitting and receiving capabilities, the NR system has specially designed a Sounding Reference Signal (SRS).

At present, the transmitting and receiving capabilities of a terminal defined in Rel-15 and Rel-16 may be divided into the following situations. A situation is that the numbers of transmitting and receiving antennas are the same, mainly including: one transmitting antenna and one receiving antenna (1T1R), two transmitting antennas and two receiving antennas (2T2R). And, another situation is that the number of receiving antenna(s) is larger than the number of transmitting antenna(s), including: one transmitting antenna and two receiving antennas (1T2R), one transmitting antenna and four receiving antennas (1T4R), and two transmitting antennas and four receiving antennas (2T4R). The uplink transmission supports up to two radio frequency transmitting channels.

SUMMARY

Embodiments of the present disclosure provide a resource configuration method, an apparatus, and a storage medium. The antenna capability reported by a terminal includes that the maximum number of layers for transmission is greater than two layers, and a network side device can configure an SRS resource set for the terminal, thereby improving the performance of uplink transmission.

In a first aspect, an embodiment of the present disclosure provides a resource configuration method. The method is performed by a network side device. The method includes: receiving an antenna capability reported by a terminal; wherein the antenna capability includes that the maximum number of layers for transmission is greater than two layers; and configuring at least one Sounding Reference Signal (SRS) resource set for the terminal according to the antenna capability reported by the terminal including that the maximum number of layers for transmission is greater than two layers.

In a second aspect, an embodiment of the present disclosure provides another resource configuration method. The method is performed by a terminal. The method includes: reporting an antenna capability of the terminal to a network side device; wherein the antenna capability includes that the maximum number of layers for transmission is greater than two layers; and receiving at least one SRS resource set configured by the network side device.

In a third aspect, an embodiment of the present disclosure provides a communication apparatus that has a part or all of functions of a network side device for implementing the method described in the first aspect. For example, the functions of the communication apparatus may include functions of a part or all of embodiments in the present disclosure, or may include a function for independently implementing any one of the embodiments of the present disclosure. The function(s) may be implemented by hardware, or may be implemented by hardware executing corresponding software. The hardware or software includes one or more units or modules corresponding to the above functions.

In an implementation, the structure of the communication apparatus may include a transceiving module and a processing module. The processing module is configured to support the communication apparatus to implement corresponding function(s) in the above method. The transceiving module is configured to support a communication between the communication apparatus and other device(s). The communication apparatus may further include a storage module coupled to the transceiving module and the processing module, and is configured to store a necessary computer program and data of the communication apparatus.

As an example, the processing module may be a processor, the transceiving module may be a transceiver or a communication interface, and the storage module may be a memory.

In an implementation, the communication apparatus includes: a transceiving module configured to receive an antenna capability reported by a terminal; wherein the antenna capability includes that the maximum number of layers for transmission is greater than two layers; and a processing module configured to configure at least one SRS resource set for the terminal according to the antenna capability reported by the terminal including that the maximum number of layers for transmission is greater than two layers.

In a fourth aspect, an embodiment of the present disclosure provides another communication apparatus that has a part or all of functions of a terminal in the example method described in the second aspect. For example, the functions of the communication apparatus may include functions of a part or all of embodiments in the present disclosure, or may include a function for independently implementing any one of the embodiments of the present disclosure. The function(s) may be implemented by hardware, or may be implemented by hardware executing corresponding software. The hardware or software includes one or more units or modules corresponding to the above functions.

In an implementation, the structure of the communication apparatus may include a transceiving module and a processing module. The processing module is configured to support the communication apparatus to implement corresponding function(s) in the above method. The transceiving module is configured to support a communication between the communication apparatus and other device(s). The communication apparatus may further include a storage module coupled to the transceiving module and the processing module, and is configured to store a necessary computer program and data of the communication apparatus.

In an implementation, the communication apparatus includes: a transceiving module configured to report an antenna capability of the terminal to a network side device;

wherein the antenna capability includes that the maximum number of layers for transmission is greater than two layers; and a processing module configured to receive at least one SRS resource set configured by the network side device.

In a fifth aspect, an embodiment of the present disclosure provides a communication apparatus. The communication apparatus includes a processor. When the processor calls a computer program in a memory, the method described in the first aspect is implemented.

In a sixth aspect, an embodiment of the present disclosure provides a communication apparatus. The communication apparatus includes a processor. When the processor calls a computer program in a memory, the method described in the second aspect is implemented.

In a seventh aspect, an embodiment of the present disclosure provides a communication apparatus. The communication apparatus includes a processor and a memory, and a computer program is stored in the memory; the processor executes the computer program stored in the memory, to cause the communication apparatus to perform the method described in the first aspect.

In an eighth aspect, an embodiment of the present disclosure provides a communication apparatus. The communication apparatus includes a processor and a memory, and a computer program is stored in the memory; the processor executes the computer program stored in the memory, to cause the communication apparatus to perform the method described in the second aspect.

In a ninth aspect, an embodiment of the present disclosure provides a communication apparatus. The apparatus includes a processor and an interface circuit. The interface circuit is configured to receive code instructions and transmit the code instructions to the processor. The processor is configured to run the code instructions to cause the apparatus to perform the method described in the first aspect.

In a tenth aspect, an embodiment of the present disclosure provides a communication apparatus. The apparatus includes a processor and an interface circuit. The interface circuit is configured to receive code instructions and transmit the code instructions to the processor. The processor is configured to run the code instructions to cause the apparatus to perform the method described in the second aspect.

In an eleventh aspect, an embodiment of the present disclosure provides a resource configuration system. The system includes the communication apparatus described in the third aspect and the communication apparatus described in the fourth aspect, or the system includes the communication apparatus described in the fifth aspect and the communication apparatus described in the sixth aspect, or the system includes the communication apparatus described in the seventh aspect and the communication apparatus described in the eighth aspect, or the system includes the communication apparatus described in the ninth aspect and the communication apparatus described in the tenth aspect.

In a twelfth aspect, an embodiment of the present disclosure provides a computer-readable storage medium configured to store instructions used by the above-mentioned terminal. When the instructions are executed, the terminal is caused to perform the method described in the first aspect.

In a thirteenth aspect, an embodiment of the present disclosure provides a readable storage medium configured to store instructions used by the above-mentioned network side device. When the instructions are executed, the network side device is caused to perform the method described in the second aspect.

In a fourteenth aspect, the present disclosure further provides a computer program product including a computer program, which when run on a computer, causes a computer to perform the method described in the first aspect.

In a fifteenth aspect, the present disclosure further provides a computer program product including a computer program, which when run on a computer, causes a computer to perform the method described in the second aspect.

In a sixteenth aspect, the present disclosure provides a chip system, which includes at least one processor and an interface for supporting the terminal to implement the function(s) involved in the first aspect, for example, determining or processing at least one of data and information involved in the above methods. In a possible design, the chip system further includes a memory, and the memory is configured to store a necessary computer program and data of the terminal. The chip system may be formed by chip(s), or may include chip(s) and other discrete device(s).

In a seventeenth aspect, the present disclosure provides a chip system, which includes at least one processor and an interface for supporting the network side device to implement the function(s) involved in the second aspect, for example, determining or processing at least one of data and information involved in the above methods. In a possible design, the chip system further includes a memory, and the memory is configured to store a necessary computer program and data of the network side device. The chip system may be formed by chip(s), or may include chip(s) and other discrete device(s).

In an eighteenth aspect, the present disclosure provides a computer program that, when run on a computer, causes a computer to perform the method described in the first aspect.

In a nineteenth aspect, the present disclosure provides a computer program that, when run on a computer, causes a computer to perform the method described in the second aspect.

BRIEF DESCRIPTION OF THE DRAWINGS

The accompanying drawings of the present disclosure will be described below.

FIG. 14 is a flow chart of yet another resource configuration method provided by an embodiment of the present disclosure;

FIG. 15 is a flow chart of yet another resource configuration method provided by an embodiment of the present disclosure;

FIG. 16 is a flow chart of yet another resource configuration method provided by an embodiment of the present disclosure;

FIG. 22 is a flow chart of yet another resource configuration method provided by an embodiment of the present disclosure;

FIG. 23 is a radio frequency structural circuit diagram of a 3T4R terminal provided by an embodiment of the present disclosure;

FIG. 24 is a flow chart of yet another resource configuration method provided by an embodiment of the present disclosure;

DETAILED DESCRIPTION

Figure 1:
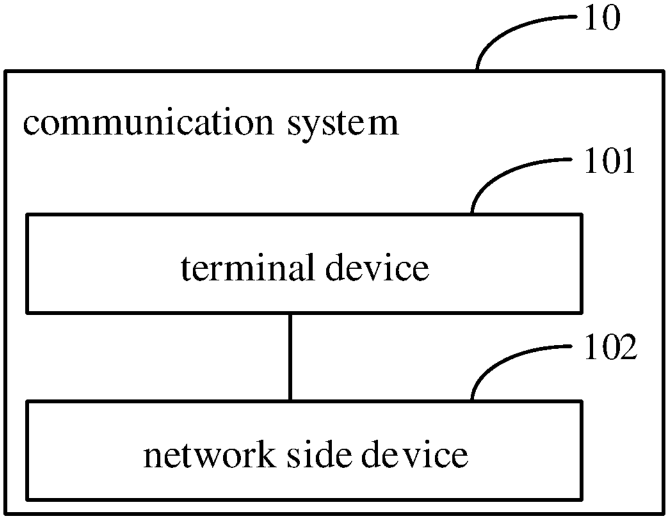
FIG. 1 is an architectural diagram of a communication system provided by an embodiment of the present disclosure.

For ease of understanding, terminologies involved in the present disclosure are first introduced.

1. Radio frequency channel: also called a radio frequency link. The radio frequency link in the uplink direction of a terminal may be called a radio frequency transmitting link, and a radio frequency link in the downlink direction of the terminal may be called a radio frequency receiving link. A baseband signal generated by the terminal in a baseband is passed to a radio frequency transmitting link to generate a radio frequency signal, and the radio frequency signal is sent through an antenna. Similarly, a signal received by the terminal from an antenna is received through a radio frequency receiving link and reaches the baseband for processing. The radio frequency link includes a radio frequency transceiver circuit, a power amplifier, and a duplexer/filter. The terminal may access a plurality of network side devices. The terminal communicates with a plurality of network side devices through a plurality of radio frequency links. One radio frequency link may correspond to one network side device. For example, the terminal may access two or four network side devices. Specifically, the terminal may access a plurality of network side devices through DC, or may access a plurality of network side devices through CA. The radio frequency link may be integrated into a radio frequency chip, or may be integrated into the same chip together with the baseband processing circuit.

2. Port: also called an antenna port. At the network side, a radio frequency link and an antenna may be abstracted into the concept of a port. When a terminal has N radio frequency links, the terminal supports using up to N ports simultaneously to communicate with network side device(s). For example, N=2, the terminal has two radio frequency links, and the terminal supports using up to two ports simultaneously to communicate with network side device(s). In actual applications, each radio frequency link corresponds to one port. If the terminal uses one port to communicate with a network side device, the terminal may use either of the two radio frequency links to correspond to this port, or the terminal may use two radio frequency links simultaneously to simulate one port, depending on specific implementations at the terminal side, and this is transparent to the network side device, and the network side device only needs to schedule which ports the terminal sends uplink signals on.

3. Antenna capability: an antenna capability includes: number of ports, number of layers, number of radio frequency links, number of antennas, maximum number of ports, maximum number of layers, maximum number of radio frequency links or maximum number of antennas, etc. Among them, the number of layers refers to the number of uncorrelated streams of signals contained when precoding is performed for data to be sent. For example, the terminal uses four ports to send data, but uses the four ports to send the same data, or in other words correlated data. It can be understood that the terminal uses the four ports to send one stream of data, or to send one layer of data. For another example, the four ports include port 0, port 1, port 2 and port 3. The terminal uses port 0 and port 1 to send the same or correlated one stream of data, and the terminal uses port 2 and port 3 to send the same data or correlated another stream of data. It can be understood that the terminal sends two layers of data. In the description of the embodiments of the present disclosure, the antenna capability may be described by taking one of the expression forms as an example, and the methods may also be applied to other expression forms of the antenna capability. In the embodiments of the present disclosure, when "antenna capability includes . . . " is mentioned, it can be replaced by "antenna capability indicates . . . ", and the two expressions have equivalent meanings.

In order to better understand a resource configuration method disclosed in the embodiments of the present disclosure, a communication system to which the embodiments of the present disclosure are applicable is first described below.

FIG. 1 is a schematic architectural diagram of a communication system 10 provided by an embodiment of the present disclosure. The communication system 10 may include but is not limited to one network side device and one terminal. The number and form of the devices shown in FIG. 1 are only illustrative and do not constitute a limitation on the embodiments of the present disclosure. In actual applications, two or more network side devices, and two or more terminals may be included. The communication system 10 shown in FIG. 1 includes a network side device 101 and a terminal 102 as an example.

It should be noted that the technical solutions of the embodiments of the present disclosure may be applied to various communication systems, for example, Long Term Evolution (LTE) system, fifth generation (5G) mobile communication system, 5G New Radio (NR) system, or other future new mobile communication systems.

The network side device 101 in the embodiments of the present disclosure is an entity at the network side that is used to transmit or receive signals. For example, the network side device 101 may be an evolved base station (evolved NodeB, eNB), a Transmission Reception Point (TRP), a next generation base station (next generation NodeB, gNB) in the NR system, or a base station in other future mobile communication system, or an access node in Wireless Fidelity (WiFi) system, etc. The embodiments of the present disclosure do not limit the specific technologies and specific device form used by the network side device. The network side device provided by the embodiments of the present disclosure may be formed by a central unit (CU) and a distributed unit (DU). The CU may also be called a control unit. The CU-DU structure may be used to split a protocol layer of a network side device (such as base station), some protocol layer functions are controlled by the CU in a centralized manner, and the remaining part or all protocol layer functions are distributed in the DU, and the DU is controlled by the CU in a centralized manner.

The terminal 102 in the embodiments of the present disclosure is an entity at the user side for receiving or transmitting signals, such as a mobile phone. A terminal may also be called a terminal device, User Equipment (UE), Mobile Station (MS), Mobile Terminal (MT), etc. The terminal may be a car with communication functions, a smart car, a mobile phone, a wearable device, a pad, a computer with wireless a transceiving function, a Virtual Reality (VR) terminal, an Augmented Reality (AR) terminal, a wireless terminal in industrial control, a wireless terminal in self-driving, a wireless terminal in remote medical surgery, a wireless terminal in smart grid, a wireless terminal in transportation safety, a wireless terminal in smart city, or a wireless terminal in smart home, etc. The embodiments of the present disclosure do not limit the specific technologies and specific device forms used by the terminal.

It can be understood that the communication system described in the embodiments of the present disclosure is for more clearly illustrating the technical solutions of the embodiments of the present disclosure, and does not constitute a limitation on the technical solutions provided by the embodiments of the present disclosure. As those of ordinary skill in the art will know, with the evolution of system architecture and the emergence of new service scenarios, the technical solutions provided by the embodiments of the present disclosure are also applicable to similar technical problems.

The resource configuration method, apparatus and storage medium provided by embodiments of the present disclosure will be introduced in detail below with reference to the accompanying drawings.

Figure 2:
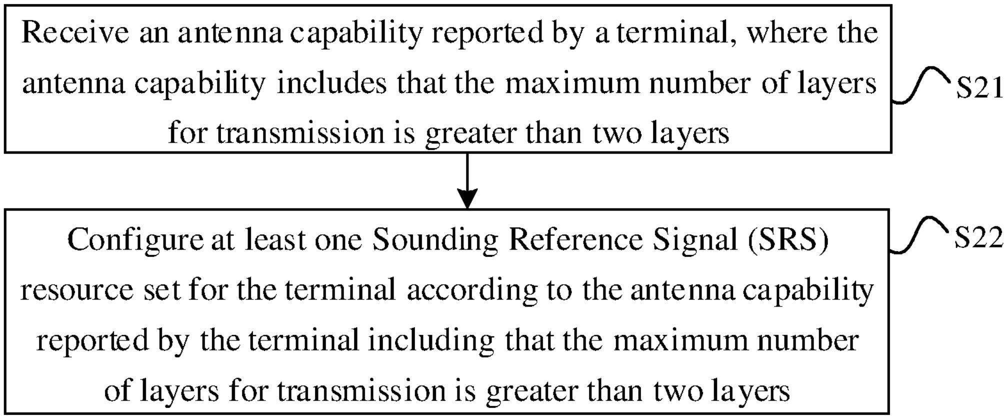
FIG. 2 is a flow chart of a resource configuration method provided by an embodiment of the present disclosure.

FIG. 2 is a flow chart of a resource configuration method provided by an embodiment of the present disclosure.

As shown in FIG. 2, the method is performed by a network side device. The method may include but is not limited to the following steps:

In S21, an antenna capability reported by a terminal is received. The antenna capability includes that the maximum number of layers for transmission is greater than two layers.

In the embodiment of the present disclosure, the terminal reports its antenna capability to the network side device before performing uplink transmission, or in any case where the terminal needs to re-report its antenna capability.

The maximum number of layers for transmission is greater than two layers, and the maximum number of layers for transmission may be three layers, four layers, or more than four layers.

It can be understood that the number of layers refers to the number of uncorrelated streams of signals contained when precoding is performed for data to be sent. For example, the terminal uses four antenna ports to send data, but uses the four antenna ports to send the same data, or in other words correlated data. It can be understood that the terminal uses the four antenna ports to send one stream of data, or to send one layer of data. For another example, the four antenna ports include port 0, port 1, port 2 and port 3. The terminal uses port 0 and port 1 to send the same or correlated one stream of data, and the terminal uses port 2 and port 3 to send the same or correlated another stream of data. It can be understood that the terminal sends two layers of data.

Of course, the antenna capability reported by the terminal may further include other capability information in addition to the maximum number of layers for transmission being greater than two layers. For example, the antenna capability may further include the number of antennas, etc. It should be noted that the above examples are only for illustration and are not intended to limit the embodiments of the present disclosure, and the embodiments of the present disclosure do not impose specific limitations on this.

In S22, at least one Sounding Reference Signal (SRS) resource set is configured for the terminal according to the antenna capability reported by the terminal including that the maximum number of layers for transmission is greater than two layers.

The Sounding Reference Signal (SRS) resource set includes SRS resource(s), and the SRS resource(s) may be time domain resource(s) and/or frequency domain resource(s) for the terminal to send SRS information.

In the embodiment of the present disclosure, after receiving the antenna capability reported by the terminal including that the maximum number of layers for transmission is greater than two layers, the network side device configures at least one SRS resource set for the terminal according to the antenna capability reported by the terminal.

It can be understood that the network side device may configure one SRS resource set for the terminal, or configure a plurality of SRS resource sets for the terminal. Specifically, the number of SRS resource sets configured by the network side device for the terminal is related to the antenna capability reported by the terminal.

In related art, a terminal supports a maximum of two radio frequency transmitting channels, and a network side device configures at least one SRS resource set for the terminal. After receiving the SRS resource set, the terminal sends SRS information to the network side device at a corresponding port through a maximum of two radio frequency transmitting channels. The terminal supports up to two layers of data for uplink transmission. The amount of data for uplink transmission is small, and the flexibility of terminal application is poor. In the embodiment of the present disclosure, the antenna capability reported by the terminal includes that the maximum number of layers for transmission is greater than two layers. The terminal can send SRS information to the network side device through more than two radio frequency transmitting channels, thereby improving the uplink transmission capability and enabling increased amount of data for uplink transmission and more flexible terminal applications.

By implementing the embodiments of the present disclosure, the network side device can receive the antenna capability reported by the terminal; wherein the antenna capability includes that the maximum number of layers for transmission is greater than two layers; based on the antenna capability reported by the terminal including that the maximum number of layers for transmission is greater than two layers, the network side device configures at least one Sounding Reference Signal (SRS) resource set for the terminal. In this way, the antenna capability reported by the terminal includes that the maximum number of layers for transmission is greater than two layers, and the network side device can configure an SRS resource set for the terminal, thereby improving the performance of uplink transmission and increasing the amount of data for uplink transmission.

Figure 3:
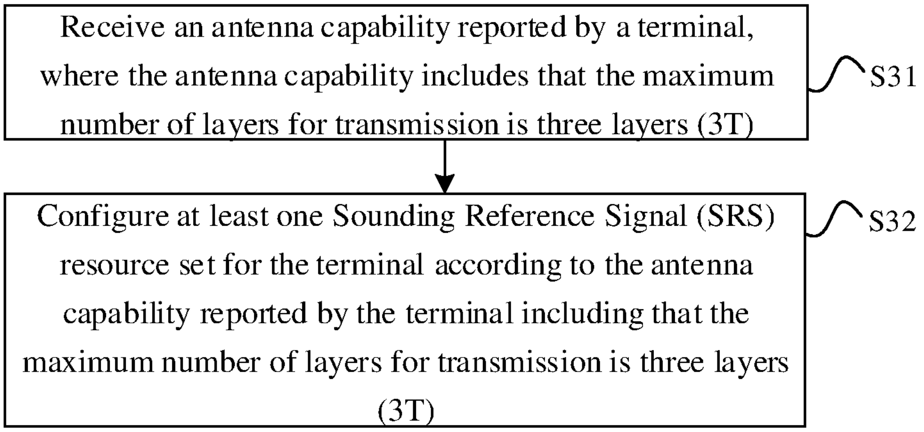
FIG. 3 is a flow chart of another resource configuration method provided by an embodiment of the present disclosure.

FIG. 3 is a flow chart of another resource configuration method provided by an embodiment of the present disclosure.

As shown in FIG. 3, the method is performed by a network side device. The method may include but is not limited to the following steps:

In S31, an antenna capability reported by a terminal is received. The antenna capability includes that the maximum number of layers for transmission is three layers (3T).

In the embodiment of the present disclosure, the terminal reports its antenna capability to the network side device before performing uplink transmission, or in any case where the terminal needs to re-report its antenna capability.

The antenna capability may include that the maximum number of layers for transmission is three layers (3T).

It can be understood that the number of layers refers to the number of uncorrelated streams of signals contained when precoding is performed for data to be sent. For example, the terminal uses four antenna ports to send data, but uses the four antenna ports to send the same data, or in other words correlated data. It can be understood that the terminal uses the four antenna ports to send one stream of data, or to send one layer of data. For another example, the four antenna ports include port 0, port 1, port 2 and port 3. The terminal uses port 0 and port 1 to send the same or correlated one stream of data, and the terminal uses port 2 and port 3 to send the same or correlated another stream of data. It can be understood that the terminal sends two layers of data. In the embodiment of the present disclosure, the antenna capability reported by the terminal includes that the maximum number of layers for transmission is three layers (3T).

Of course, the antenna capability reported by the terminal may further include other capability information in addition to the maximum number of layers for transmission being three layers (3T). For example, the antenna capability may further include the number of antennas, etc.

It should be noted that the above examples are only for illustration and are not intended to limit the embodiments of the present disclosure, and the embodiments of the present disclosure do not impose specific limitations on this.

In S32, at least one SRS resource set is configured for the terminal according to the antenna capability reported by the terminal including that the maximum number of layers for transmission is three layers (3T).

The SRS resource set includes SRS resource(s), and the SRS resource(s) may be time domain resource(s) and/or frequency domain resource(s) for the terminal to send SRS information.

In the embodiment of the present disclosure, after receiving the antenna capability reported by the terminal including that the maximum number of layers for transmission is three layers (3T), the network side device configures at least one SRS resource set for the terminal according to the antenna capability reported by the terminal.

It can be understood that the network side device may configure one SRS resource set for the terminal, or configure a plurality of SRS resource sets for the terminal. Specifically, the number of SRS resource sets configured by the network side device for the terminal is related to the antenna capability reported by the terminal.

Figure 4:
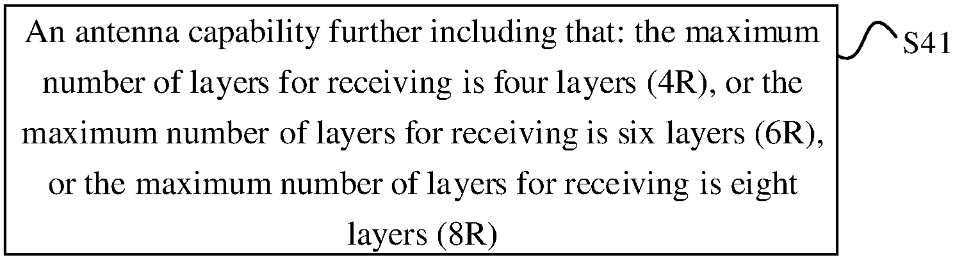
FIG. 4 is a flow chart of yet another resource configuration method provided by an embodiment of the present disclosure.

In the embodiment of the present disclosure, the antenna capability reported by the terminal includes that the maximum number of layers for transmission is three layers, and the terminal can send SRS information to the network side device through three radio frequency transmitting channels, thereby improving the uplink transmission capability and enabling increased amount of data for the uplink transmission and more flexible terminal applications. FIG. 4 is a flow chart of yet another resource configuration method provided by an embodiment of the present disclosure.

As shown in FIG. 4, the method is performed by a network side device. The method may include but is not limited to the following steps:

In S41, an antenna capability further includes that: the maximum number of layers for receiving is four layers (4R), or the maximum number of layers for receiving is six layers (6R), or the maximum number of layers for receiving is eight layers (8R).

It can be understood that the maximum number of layers for receiving being four layers (4R) means that the terminal has the capability of receiving up to four layers of data; the maximum number of layers for receiving being six layers (6R) means that the terminal has the capability of receiving up to six layers of data; the maximum number of layers for receiving being eight layers (8R) means that the terminal has the capability of receiving up to eight layers of data.

It should be noted that S41 may be implemented alone or in combination with any other step in the embodiments of the present disclosure, for example, being implemented in combination with S21 and S22 and/or S31 and S32 in the embodiments of the present disclosure, and the embodiments of the present disclosure do not limit this.

In embodiments of the present disclosure, the antenna capability reported by the terminal includes that: the maximum number of layers for transmission is three layers (3T) and the maximum number of layers for receiving is four layers (4R), that is, 3T4R; or the maximum number of layers for transmission is three layers (3T) and the maximum number of layers for receiving is six layers (6R), that is, 3T6R; or the maximum number of layers for transmission is three layers (3T) and the maximum number of layers for receiving is eight layers (8R), that is, 3T8R. In this way, the terminal can inform the network side device of its antenna capability, so that the network side device can configure a corresponding SRS resource set according to the antenna capability reported by the terminal.

Figure 5:
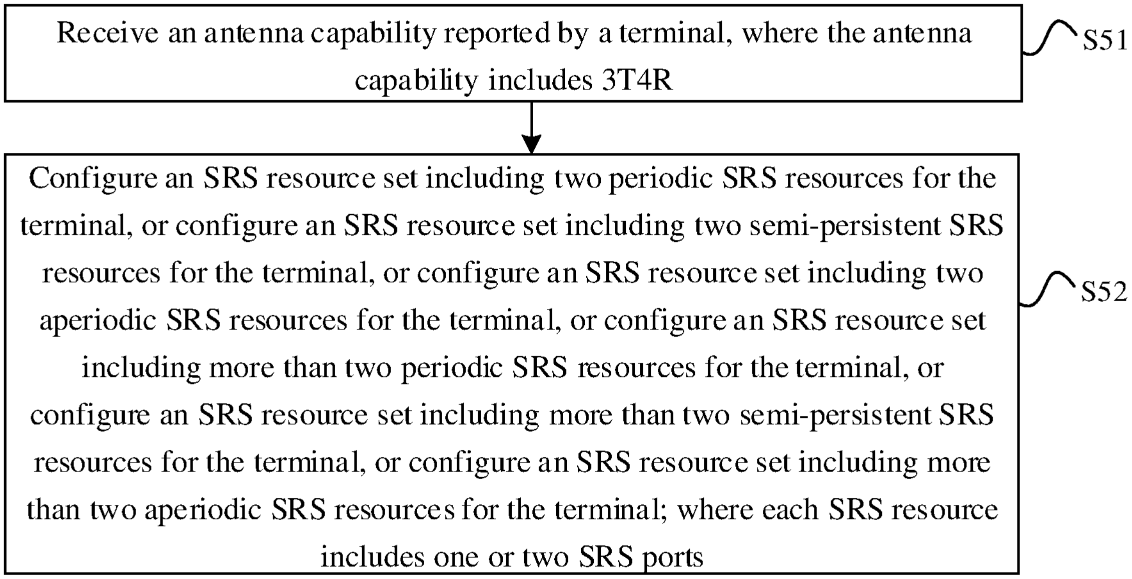
FIG. 5 is a flow chart of yet another resource configuration method provided by an embodiment of the present disclosure.

FIG. 5 is a flow chart of yet another resource configuration method provided by an embodiment of the present disclosure.

As shown in FIG. 5, the method is performed by a network side device. The method may include but is not limited to the following steps:

In S51, an antenna capability reported by a terminal is received. The antenna capability includes: 3T4R.

The antenna capability includes 3T4R, that is, the maximum number of layers for transmission is three layers (3T) and the maximum number of layers for receiving is four layers (4R), which means that the terminal has the capability of transmitting up to three layers of data and the capability of receiving up to four layers of data.

In S52, an SRS resource set including two periodic SRS resources is configured for the terminal, or an SRS resource set including two semi-persistent SRS resources is configured for the terminal, or an SRS resource set including two aperiodic SRS resources is configured for the terminal, or an SRS resource set including more than two periodic SRS resources is configured for the terminal, or an SRS resource set including more than two semi-persistent SRS resources is configured for the terminal, or an SRS resource set including more than two aperiodic SRS resources is configured for the terminal; wherein each SRS resource includes one or two SRS ports.

In the embodiment of the present disclosure, when the antenna capability reported by the terminal includes 3T4R, the network side device configures an SRS resource set for the terminal. The SRS resource set includes two or more SRS resources. The SRS resources may be periodic or semi-persistent or aperiodic SRS resources.

It can be understood that when the antenna capability reported by the terminal includes 3T4R, the terminal has at least four antennas, three radio frequency transmitting channels, and four radio frequency receiving channels.

Figure 6:
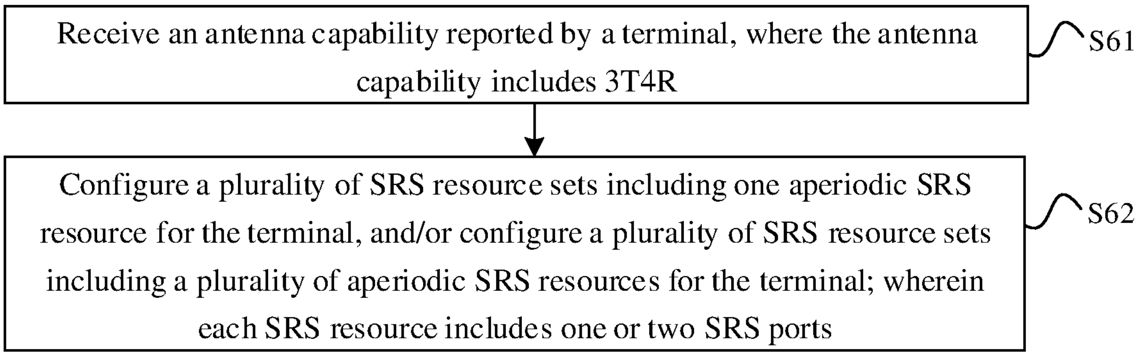
FIG. 6 is a flow chart of yet another resource configuration method provided by an embodiment of the present disclosure.

FIG. 6 is a flow chart of yet another resource configuration method provided by an embodiment of the present disclosure.

As shown in FIG. 6, the method is performed by a network side device. The method may include but is not limited to the following steps:

In S61, an antenna capability reported by a terminal is received. The antenna capability includes: 3T4R.

The antenna capability includes 3T4R, that is, the maximum number of layers for transmission is three layers (3T) and the maximum number of layers for receiving is four layers (4R), which means that the terminal has the capability of transmitting up to three layers of data and the capability of receiving up to four layers of data.

In S62, a plurality of SRS resource sets including one aperiodic SRS resource are configured for the terminal, and/or a plurality of SRS resource sets including a plurality of aperiodic SRS resources are configured for the terminal; wherein each SRS resource includes one or two SRS ports.

In the embodiment of the present disclosure, in a case where the antenna capability reported by the terminal includes 3T4R, the network side device configures a plurality of SRS resource sets for the terminal. The SRS resource set includes two or more SRS resources. The SRS resources may be aperiodic SRS resources.

It can be understood that in a case where the antenna capability reported by the terminal includes 3T4R, the terminal has at least four antennas, three radio frequency transmitting channels, and four radio frequency receiving channels.

Figure 7:
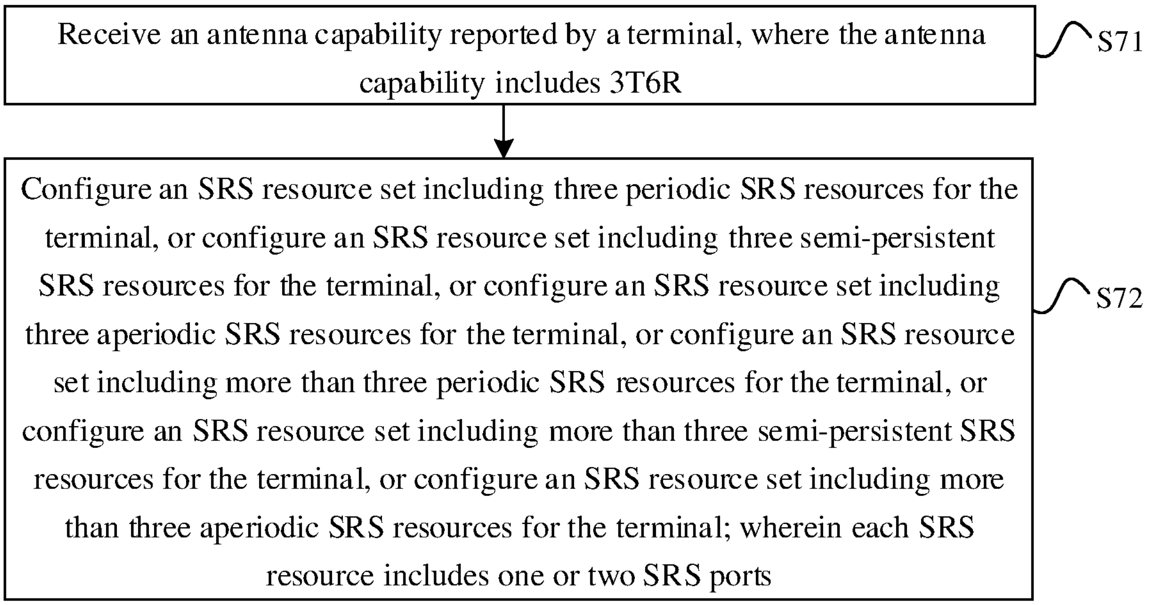
FIG. 7 is a flow chart of yet another resource configuration method provided by an embodiment of the present disclosure.

FIG. 7 is a flow chart of yet another resource configuration method provided by an embodiment of the present disclosure.

As shown in FIG. 7, the method is performed by a network side device. The method may include but is not limited to the following steps:

In S71, an antenna capability reported by a terminal is received. The antenna capability includes: 3T6R.

The antenna capability includes 3T6R, that is, the maximum number of layers for transmission is three layers (3T) and the maximum number of layers for receiving is six layers. 6R, which means that the terminal has the capability of transmitting up to three layers of data and the capability of receiving up to six layers of data.

In S72, an SRS resource set including three periodic SRS resources is configured for the terminal, or an SRS resource set including three semi-persistent SRS resources is configured for the terminal, or an SRS resource set including three aperiodic SRS resources is configured for the terminal, or an SRS resource set including more than three periodic SRS resources is configured for the terminal, or an SRS resource set including more than three semi-persistent SRS resources is configured for the terminal, or an SRS resource set including more than three aperiodic SRS resources is configured for the terminal; wherein each SRS resource includes one or two SRS ports.

In the embodiment of the present disclosure, in a case where the antenna capability reported by the terminal includes 3T6R, the network side device configures an SRS resource set for the terminal. The SRS resource set includes three or more SRS resources. The SRS resources may be periodic or semi-persistent or aperiodic SRS resources.

It can be understood that in a case where the antenna capability reported by the terminal includes 3T6R, the terminal has at least six antennas, three radio frequency transmitting channels, and six radio frequency receiving channels.

Figure 8:
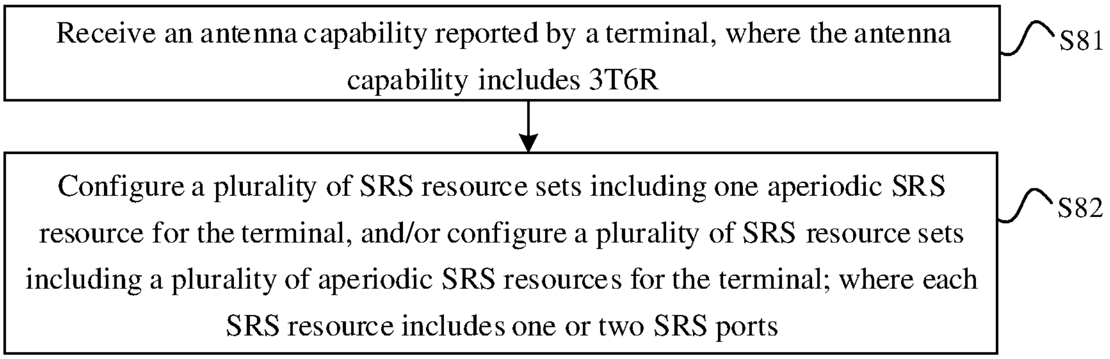
FIG. 8 is a flow chart of yet another resource configuration method provided by an embodiment of the present disclosure.

FIG. 8 is a flow chart of yet another resource configuration method provided by an embodiment of the present disclosure.

As shown in FIG. 8, the method is performed by a network side device. The method may include but is not limited to the following steps:

In S81, an antenna capability reported by a terminal is received. The antenna capability includes: 3T6R.

The antenna capability includes 3T6R, that is, the maximum number of layers for transmission is three layers (3T) and the maximum number of layers for receiving is six layers (6R), which means that the terminal has the capability of transmitting up to three layers of data and the capability of receiving up to six layers of data.

In S82, a plurality of SRS resource sets including one aperiodic SRS resource are configured for the terminal, and/or a plurality of SRS resource sets including a plurality of aperiodic SRS resources are configured for the terminal; wherein each SRS resource includes one or two SRS ports.

In the embodiment of the present disclosure, in a case where the antenna capability reported by the terminal includes 3T6R, the network side device configures a plurality of SRS resource sets for the terminal. The SRS resource set includes one or more SRS resources. The SRS resources may be aperiodic SRS resources.

It can be understood that in a case where the antenna capability reported by the terminal includes 3T6R, the terminal has at least six antennas, three radio frequency transmitting channels, and six radio frequency receiving channels.

Figure 9:
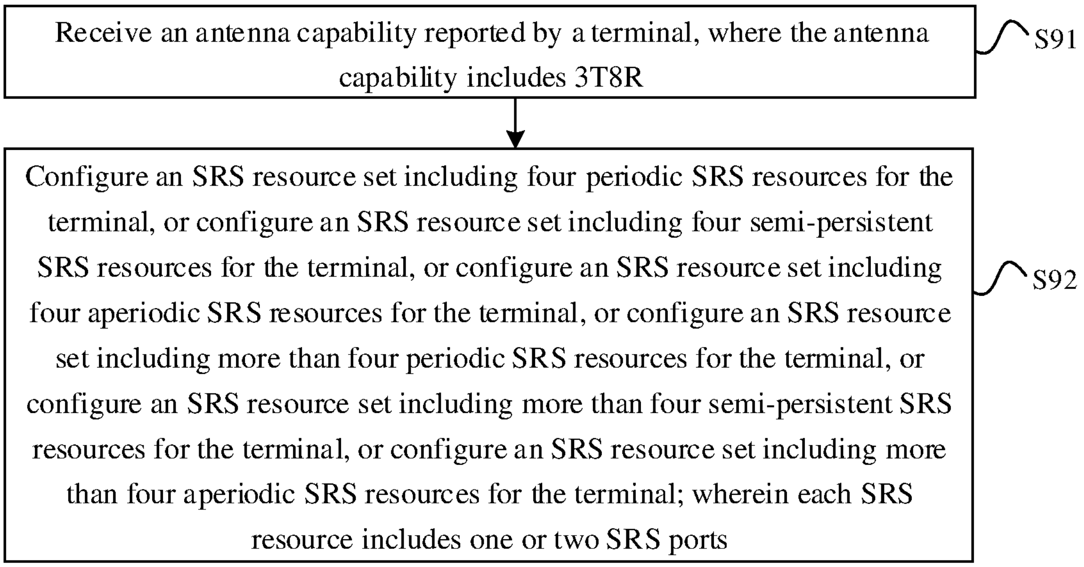
FIG. 9 is a flow chart of yet another resource configuration method provided by an embodiment of the present disclosure.

FIG. 9 is a flow chart of yet another resource configuration method provided by an embodiment of the present disclosure.

As shown in FIG. 9, the method is performed by a network side device. The method may include but is not limited to the following steps:

In S91, an antenna capability reported by a terminal is received. The antenna capability includes: 3T8R.

The antenna capability includes 3T8R, that is, the maximum number of layers for transmission is three layers (3T) and the maximum number of layers for receiving is eight layers (8R), which means that the terminal has the capability of transmitting up to three layers of data and the capability of receiving up to eight layers of data.

In S92, an SRS resource set including four periodic SRS resources is configured for the terminal, or an SRS resource set including four semi-persistent SRS resources is configured for the terminal, or an SRS resource set including four aperiodic SRS resources is configured for the terminal, or an SRS resource set including more than four periodic SRS resources is configured for the terminal, or an SRS resource set including more than four semi-persistent SRS resources is configured for the terminal, or an SRS resource set including more than four aperiodic SRS resources is configured for the terminal; wherein each SRS resource includes one or two SRS ports.

In the embodiment of the present disclosure, in a case where the antenna capability reported by the terminal includes 3T8R, the network side device configures an SRS resource set for the terminal. The SRS resource set includes four or more SRS resources. The SRS resources may be periodic or semi-persistent or aperiodic SRS resources.

It can be understood that in a case where the antenna capability reported by the terminal includes 3T8R, the terminal has at least eight antennas, three radio frequency transmitting channels, and eight radio frequency receiving channels.

Figure 10:
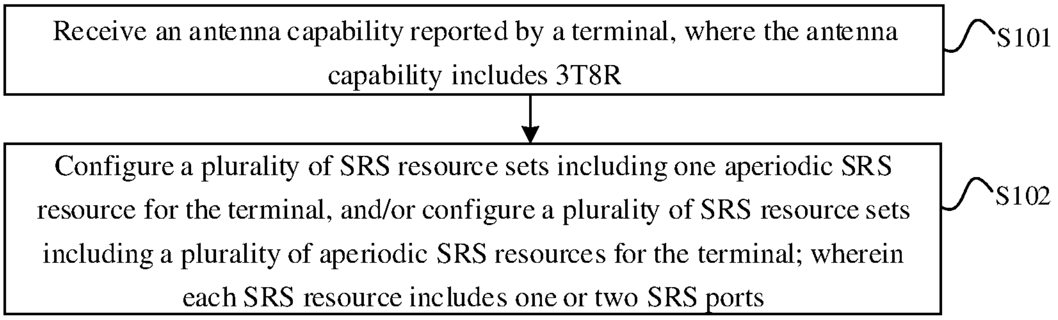
FIG. 10 is a flow chart of yet another resource configuration method provided by an embodiment of the present disclosure.

FIG. 10 is a flow chart of yet another resource configuration method provided by an embodiment of the present disclosure.

As shown in FIG. 10, the method is performed by a network side device. The method may include but is not limited to the following steps:

In S101, an antenna capability reported by a terminal is received. The antenna capability includes: 3T8R.

The antenna capability includes 3T8R, that is, the maximum number of layers for transmission is three layers (3T) and the maximum number of layers for receiving is eight layers (8R), which means that the terminal has the capability of transmitting up to three layers of data and the capability of receiving up to eight layers of data.

In S102, a plurality of SRS resource sets including one aperiodic SRS resource are configured for the terminal, and/or a plurality of SRS resource sets including a plurality of aperiodic SRS resources are configured for the terminal; wherein each SRS resource includes one or two SRS ports.

In the embodiment of the present disclosure, in a case where the antenna capability reported by the terminal includes 3T8R, the network side device configures a plurality of SRS resource sets for the terminal. The SRS resource set includes one or more SRS resources. The SRS resources may be aperiodic SRS resources.

It can be understood that in a case where the antenna capability reported by the terminal includes 3T8R, the terminal has at least eight antennas, three radio frequency transmitting channels, and eight radio frequency receiving channels.

Figure 11:
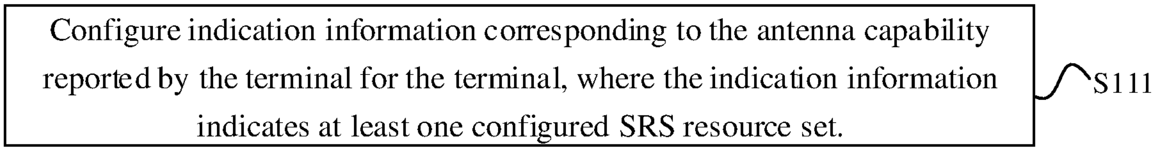
FIG. 11 is a flow chart of yet another resource configuration method provided by an embodiment of the present disclosure.

FIG. 11 is a flow chart of yet another resource configuration method provided by an embodiment of the present disclosure.

As shown in FIG. 11, the method is performed by a network side device. The method may include but is not limited to the following steps:

In S111, indication information corresponding to the antenna capability reported by the terminal is configured for the terminal. The indication information indicates at least one configured SRS resource set.

In the embodiment of the present disclosure, after receiving the antenna capability reported by the terminal, the network side device configures the indication information corresponding to its antenna capability for the terminal, and the indication information indicates at least one configured SRS resource set.

In some embodiments, the indication information includes Radio Resource Control (RRC) signaling.

It should be noted that S111 may be implemented alone or in combination with any other step in the embodiments of the present disclosure, for example, being implemented in combination with S21 and S22 and/or S31 and S22 and/or S41 and/or S51 and S52 and/or S61 and S62 and/or S71 and S72 and/or S81 and S82 and/or S91 and S92 and/or S101 and S102 in the embodiments of the present disclosure, and the embodiments of the present disclosure do not limit this.

Figure 12:
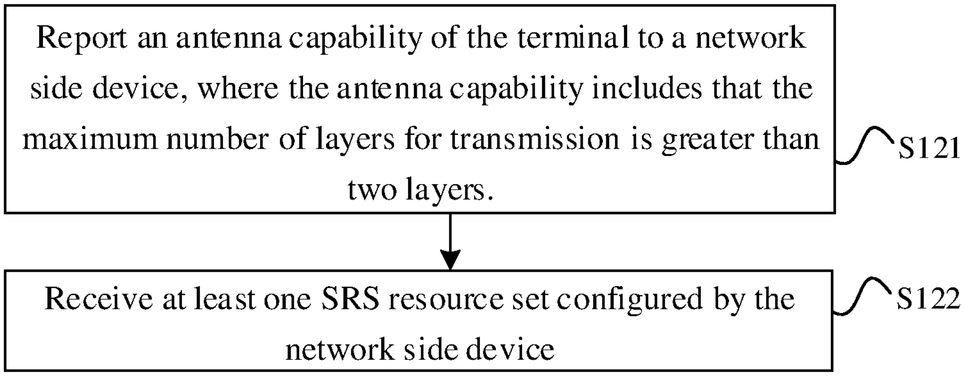
FIG. 12 is a flow chart of yet another resource configuration method provided by an embodiment of the present disclosure.

FIG. 12 is a flow chart of yet another resource configuration method provided by an embodiment of the present disclosure.

As shown in FIG. 12, the method is performed by a terminal. The method may include but is not limited to the following steps:

In S121, an antenna capability of the terminal is reported to a network side device. The antenna capability includes that the maximum number of layers for transmission is greater than two layers.

In the embodiment of the present disclosure, the terminal reports its antenna capability to the network side device before performing uplink transmission, or in any case where it needs to re-report its antenna capability.

The maximum number of layers for transmission is greater than two layers, and the maximum number of layers for transmission may be three layers, four layers or more than four layers.

It can be understood that the number of layers refers to the number of uncorrelated streams of signals contained when precoding is performed for data to be sent. For example, the terminal uses four antenna ports to send data, but uses the four antenna ports to send the same data, or in other words correlated data. It can be understood that the terminal uses the four antenna ports to send one stream of data, or to send one layer of data. For another example, the four antenna ports include port 0, port 1, port 2 and port 3. The terminal uses port 0 and port 1 to send the same or correlated one stream of data, and the terminal uses port 2 and port 3 to send the same or correlated another stream of data. It can be understood that the terminal sends two layers of data. In the embodiment of the present disclosure, the antenna capability reported by the terminal includes that the maximum number of layers for transmission is three layers (3T).

Of course, the antenna capability reported by the terminal may further include other capability information in addition to the maximum number of layers for transmission being three layers (3T). For example, the antenna capability may further include the number of antennas, etc. It should be noted that the above examples are only for illustration and are not intended to limit the embodiments of the present disclosure, and the embodiments of the present disclosure do not impose specific limitations on this.

In S122, at least one SRS resource set configured by the network side device is received.

The SRS resource set includes SRS resource(s), and the SRS resource(s) may be time domain resource(s) and/or frequency domain resource(s) for the terminal to send SRS information.

In the embodiment of the present disclosure, after receiving the antenna capability reported by the terminal including that the maximum number of layers for transmission is three layers (3T), the network side device configures at least one SRS resource set for the terminal according to the antenna capability reported by the terminal.

It can be understood that the network side device can configure one SRS resource set for the terminal, or configure a plurality of SRS resource sets for the terminal. Specifically, the number of SRS resource sets configured by the network side device for the terminal is related to the antenna capability reported by the terminal.

In related art, a terminal supports a maximum of two radio frequency transmitting channels, and a network side device configures at least one SRS resource set for the terminal. The terminal receives the SRS resource set, and sends SRS information to the network side device at a corresponding port through a maximum of two radio frequency transmitting channels. The terminal supports up to two layers of data for uplink transmission. The amount of data for uplink transmission is small, and the flexibility of terminal application is poor. In the embodiment of the present disclosure, the antenna capability reported by the terminal includes that the maximum number of layers for transmission is greater than two layers. The terminal can send SRS information to the network side device through more than two radio frequency transmitting channels, thereby improving the uplink transmission capability and enabling increased amount of data for uplink transmission and more flexible terminal applications.

By implementing the embodiment of the present disclosure, the network side device can receive the antenna capability reported by the terminal; wherein the antenna capability includes that the maximum number of layers for transmission is greater than two layers; based on the antenna capability reported by the terminal including that the maximum number of layers for transmission is greater than two layers, the network side device configures at least one SRS resource set for the terminal. In this way, the antenna capability of the terminal includes that the maximum number of layers for transmission is greater than two layers, and the network side device can configure an SRS resource set for the terminal, thereby improving the performance of uplink transmission and increasing the amount of data for uplink transmission.

Figure 13:
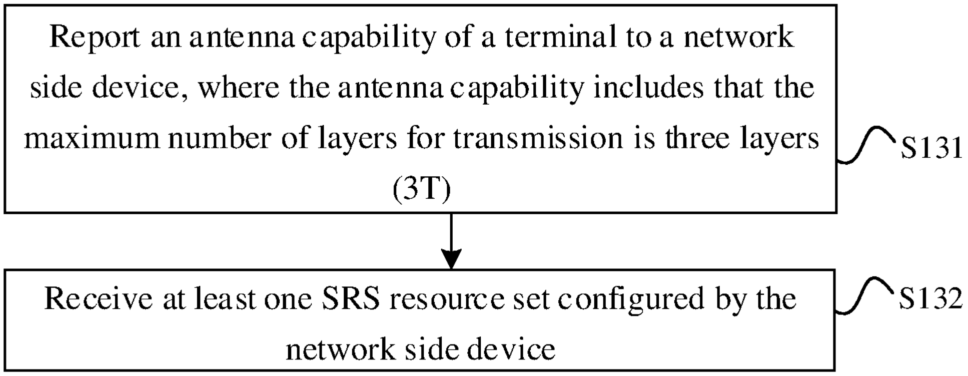
FIG. 13 is a flow chart of yet another resource configuration method provided by an embodiment of the present disclosure.

FIG. 13 is a flow chart of yet another resource configuration method provided by an embodiment of the present disclosure.

As shown in FIG. 13, the method is performed by a terminal. The method may include but is not limited to the following steps:

In S131, an antenna capability of a terminal is reported to a network side device. The antenna capability includes that the maximum number of layers for transmission is three layers (3T).

In the embodiments of the present disclosure, the terminal reports its antenna capability to the network side device before performing uplink transmission, or in any case where it needs to re-report its antenna capability.

The antenna capability may include that the maximum number of layers for transmission is three layers (3T).

It can be understood that the number of layers refers to the number of uncorrelated streams of signals contained when precoding is performed for data to be sent. For example, the terminal uses four antenna ports to send data, but uses the four antenna ports to send the same data, or in other words correlated data. It can be understood that the terminal uses the four antenna ports to send one stream of data, or to send one layer of data. For another example, the four antenna ports include port 0, port 1, port 2 and port 3. The terminal uses port 0 and port 1 to send the same or correlated one stream of data, and the terminal uses port 2 and port 3 to send the same or correlated another stream of data. It can be understood that the terminal sends two layers of data. In the embodiment of the present disclosure, the antenna capability reported by the terminal includes that the maximum number of layers for transmission is three layers (3T).

Of course, the antenna capability reported by the terminal may further include other capability information in addition to the maximum number of layers for transmission being three layers (3T). For example, the antenna capability may further include the number of antennas, etc. It should be noted that the above examples are only for illustration and are not intended to limit the embodiments of the present disclosure, and the embodiments of the present disclosure do not impose specific limitations on this.

In S132, at least one SRS resource set configured by the network side device is received.

The SRS resource set includes SRS resource(s), and the SRS resource(s) may be time domain resource(s) and/or frequency domain resource(s) for the terminal to send SRS information.

In the embodiment of the present disclosure, after receiving the antenna capability reported by the terminal including that the maximum number of layers for transmission is three layers (3T), the network side device configures at least one SRS resource set for the terminal according to the antenna capability reported by the terminal.

It can be understood that the network side device may configure one SRS resource set for the terminal, or configure a plurality of SRS resource sets for the terminal. Specifically, the number of SRS resource sets configured by the network side device for the terminal is related to the antenna capability reported by the terminal.

In the embodiment of the present disclosure, the antenna capability reported by the terminal includes that the maximum number of layers for transmission is three layers, and the terminal can send SRS information to the network side device through three radio frequency transmitting channels, thereby improving the uplink transmission capability and enabling increased amount of data for uplink transmission data and more flexible terminal applications. FIG. 14 is a flow chart of another resource configuration method provided by an embodiment of the present disclosure.

As shown in FIG. 14, the method is performed by a terminal. The method may include but is not limited to the following steps:

In S141, the antenna capability further includes that: the maximum number of layers for receiving is four layers (4R), or the maximum number of layers for receiving is six layers (6R), or the maximum number of layers for receiving is eight layers (8R).

It can be understood that the maximum number of layers for receiving being four layers (4R) means that the terminal has the capability of receiving up to four layers of data; the maximum number of layers for receiving being six layers (6R) means that the terminal has the capability of receiving up to six layers of data; the maximum number of layers for receiving being eight layers (8R) means that the terminal has the capability of receiving up to eight layers of data.

It should be noted that S141 may be implemented alone or in combination with any other step in the embodiments of the present disclosure, for example, being implemented in combination with S111 and S112 and/or S121 and S122 in the embodiments of the present disclosure, and the embodiments of the present disclosure do not limit this.

In the embodiments of the present disclosure, the antenna capability reported by the terminal includes that: the maximum number of layers for transmission is three layers (3T) and the maximum number of layers for receiving is four layers (4R), that is, 3T4R; or the maximum number of layers for transmission is three layers (3T0 and the maximum number of layers for receiving is six layers (6R), that is, 3T6R; or the maximum number of layers for transmission is three layers (3T) and the maximum number of layers for receiving is eight layers (8R), that is, 3T8R. In this way, the terminal can inform the network side device of its antenna capability, so that the network side device can configure a corresponding SRS resource set according to the antenna capability reported by the terminal.

FIG. 15 is a flow chart of yet another resource configuration method provided by an embodiment of the present disclosure.

As shown in FIG. 15, the method is performed by a terminal. The method may include but is not limited to the following steps:

In S151, an antenna capability of the terminal is reported to a network side device. The antenna capability includes: 3T4R.

The antenna capability includes 3T4R, that is, the maximum number of layers for transmission is three layers (3T) and the maximum number of layers for receiving is four layers (4R), which means that the terminal has the capability of transmitting up to three layers of data and the capability of receiving up to four layers of data.

In S152, an SRS resource set including two periodic SRS resources configured by the network side device is received, or an SRS resource set including two semi-persistent SRS resources configured by the network side device is received, or an SRS resource set including two aperiodic SRS resources configured by the network side device is received, or an SRS resource set including more than two periodic SRS resources configured by the network side device is received, or an SRS resource set including more than two semi-persistent SRS resources configured by the network side device is received, or an SRS resource set including more than two aperiodic SRS resources configured by the network side device is received; wherein each SRS resource includes one or two SRS ports.

In the embodiment of the present disclosure, in a case where the antenna capability reported by the terminal includes 3T4R, the network side device configures an SRS resource set for the terminal. The SRS resource set includes two or more SRS resources. The SRS resources may be periodic or semi-persistent or aperiodic SRS resources.

It can be understood that in a case where the antenna capability reported by the terminal includes 3T4R, the terminal has at least four antennas, three radio frequency transmitting channels, and four radio frequency receiving channels.

FIG. 16 is a flow chart of yet another resource configuration method provided by an embodiment of the present disclosure.

As shown in FIG. 16, the method is performed by a terminal. The method may include but is not limited to the following steps:

In S161, an antenna capability of the terminal is reported to a network side device. The antenna capability includes: 3T4R.

The antenna capability includes 3T4R, that is, the maximum number of layers for transmission is three layers (3T) and the maximum number of layers for receiving is four layers (4R), which means that the terminal has the capability of transmitting up to three layers of data and the capability of receiving up to four layers of data.

In S162, a plurality of SRS resource sets including one aperiodic SRS resource configured by the network side device are received, and/or a plurality of SRS resource sets including a plurality of aperiodic SRS resources configured by the network side device are received; wherein each SRS resource includes one or two SRS ports.

In the embodiment of the present disclosure, in a case where the antenna capability reported by the terminal includes 3T4R, the network side device configures a plurality of SRS resource sets for the terminal. The SRS resource set includes two or more SRS resources. The SRS resources may be aperiodic SRS resources.

It can be understood that in a case where the antenna capability reported by the terminal includes 3T4R, the terminal has at least four antennas, three radio frequency transmitting channels, and four radio frequency receiving channels.

Figure 17:
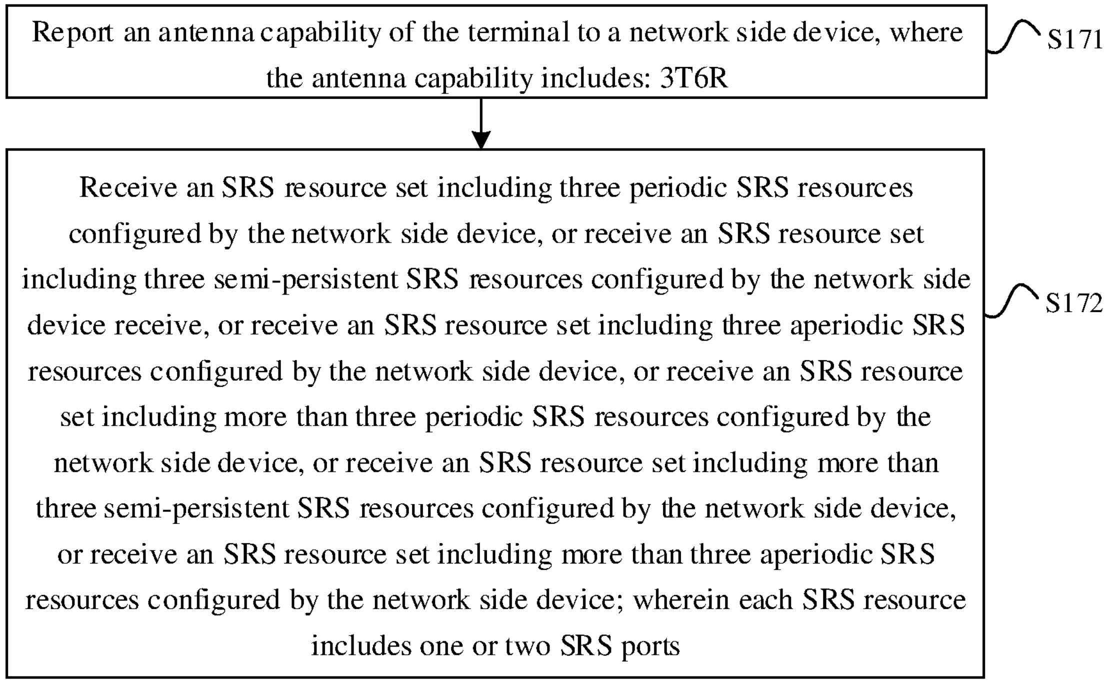
FIG. 17 is a flow chart of yet another resource configuration method provided by an embodiment of the present disclosure.

FIG. 17 is a flow chart of yet another resource configuration method provided by an embodiment of the present disclosure.

As shown in FIG. 17, the method is performed by a terminal. The method may include but is not limited to the following steps:

In S171, an antenna capability of the terminal is reported to a network side device. The antenna capability includes: 3T6R.

The antenna capability includes: 3T6R, that is, the maximum number of layers for transmission is three layers (3T) and the maximum number of layers for receiving is six layers (6R), which means that the terminal has the capability of transmitting up to three layers of data and the capability of receiving up to six layers of data.

In S172, an SRS resource set including three periodic SRS resources configured by the network side device is received, or an SRS resource set including three semi-persistent SRS resources configured by the network side device is received, or an SRS resource set including three aperiodic SRS resources configured by the network side device is received, or an SRS resource set including more than three periodic SRS resources configured by the network side device is received, or an SRS resource set including more than three semi-persistent SRS resources configured by the network side device is received, or an SRS resource set including more than three aperiodic SRS resources configured by the network side device is received; wherein each SRS resource includes one or two SRS ports.

In the embodiment of the present disclosure, in a case where the antenna capability reported by the terminal includes 3T6R, the network side device configures an SRS resource set for the terminal. The SRS resource set includes three or more SRS resources. The SRS resources may be periodic or semi-persistent or aperiodic SRS resources.

It can be understood that in a case where the antenna capability reported by the terminal includes 3T6R, the terminal has at least six antennas, three radio frequency transmitting channels, and six radio frequency receiving channels.

Figure 18:
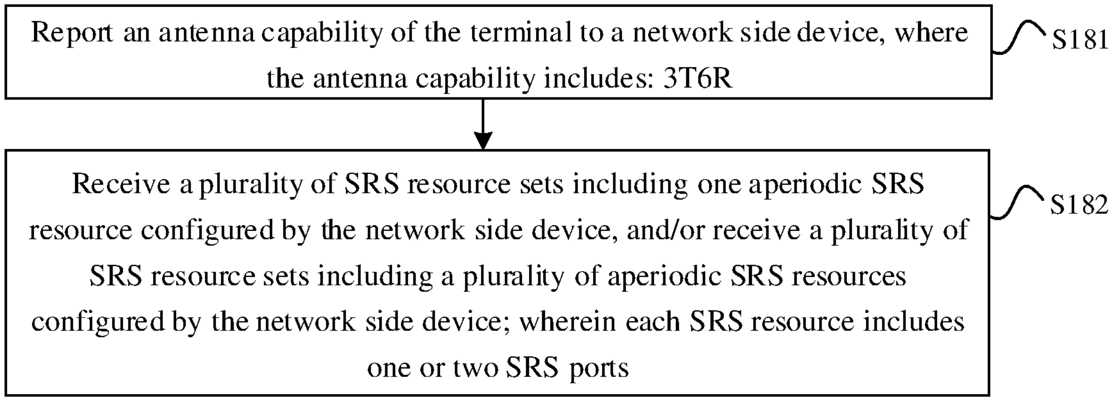
FIG. 18 is a flow chart of yet another resource configuration method provided by an embodiment of the present disclosure.

FIG. 18 is a flow chart of yet another resource configuration method provided by an embodiment of the present disclosure.

As shown in FIG. 18, the method is performed by a terminal. The method may include but is not limited to the following steps:

In S181, an antenna capability of the terminal is reported to a network side device. The antenna capability includes: 3T6R.

The antenna capability includes 3T6R, that is, the maximum number of layers for transmission is three layers (3T) and the maximum number of layers for receiving is six layers (6R), which means that the terminal has the capability of transmitting up to three layers of data and the capability of receiving up to six layers of data.

In S182, a plurality of SRS resource sets including one aperiodic SRS resource configured by the network side device are received, and/or a plurality of SRS resource sets including a plurality of aperiodic SRS resources configured by the network side device are received; wherein each SRS resource includes one or two SRS ports.

In the embodiment of the present disclosure, in a case where the antenna capability reported by the terminal includes 3T6R, the network side device configures a plurality of SRS resource sets for the terminal. The SRS resource set includes one or more SRS resources. The SRS resources may be aperiodic SRS resources.

It can be understood that in a case where the antenna capability reported by the terminal includes 3T6R, the terminal has at least six antennas, three radio frequency transmitting channels, and six radio frequency receiving channels.

Figure 19:
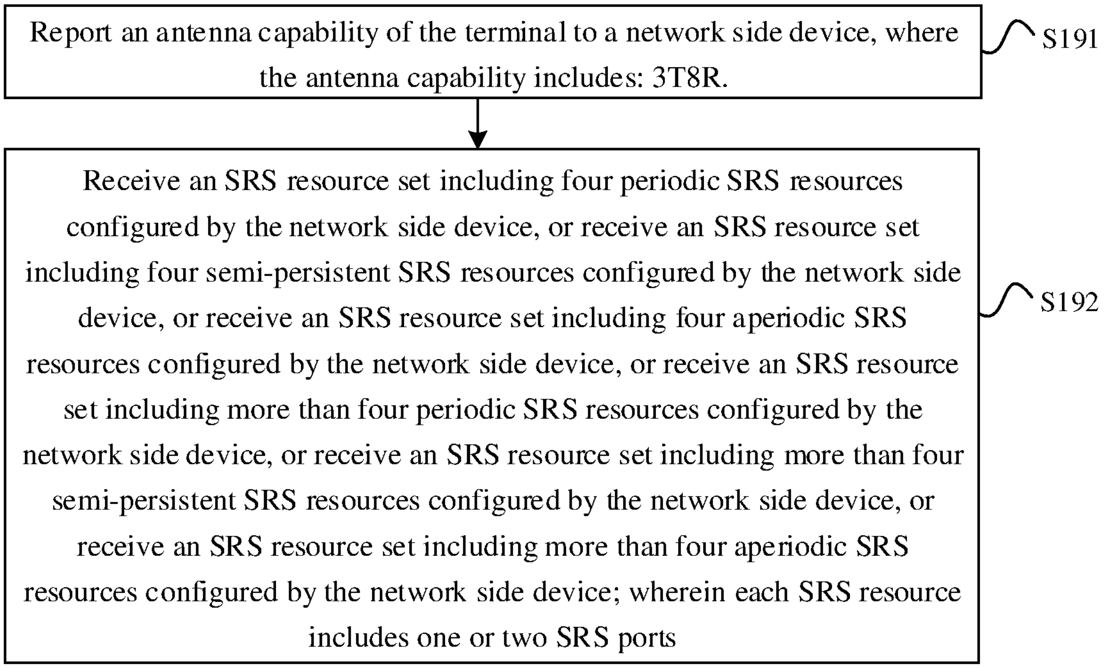
FIG. 19 is a flow chart of yet another resource configuration method provided by an embodiment of the present disclosure.

FIG. 19 is a flow chart of yet another resource configuration method provided by an embodiment of the present disclosure.

As shown in FIG. 19, the method is performed by a terminal. The method may include but is not limited to the following steps:

In S191, an antenna capability of the terminal is reported to a network side device. The antenna capability includes: 3T8R.

The antenna capability includes 3T8R, that is, the maximum number of layers for transmission is three layers (3T) and the maximum number of layers for receiving is eight layers (8R), which means that the terminal has the capability of transmitting up to three layers of data and the capability of receiving up to eight layers of data.

In S192, an SRS resource set including four periodic SRS resources configured by the network side device is received, or an SRS resource set including four semi-persistent SRS resources configured by the network side device is received, or an SRS resource set including four aperiodic SRS resources configured by the network side device is received, or an SRS resource set including more than four periodic SRS resources configured by the network side device is received, or an SRS resource set including more than four semi-persistent SRS resources configured by the network side device is received, or an SRS resource set including more than four aperiodic SRS resources configured by the network side device is received; wherein each SRS resource includes one or two SRS ports.

In the embodiment of the present disclosure, in a case where the antenna capability reported by the terminal includes 3T8R, the network side device configures an SRS resource set for the terminal. The SRS resource set includes four or more SRS resources. The SRS resources may be periodic or semi-persistent or aperiodic SRS resources.

It can be understood that in a case where the antenna capability reported by the terminal includes 3T8R, the terminal has at least eight antennas, three radio frequency transmitting channels, and eight radio frequency receiving channels.

Figure 20:
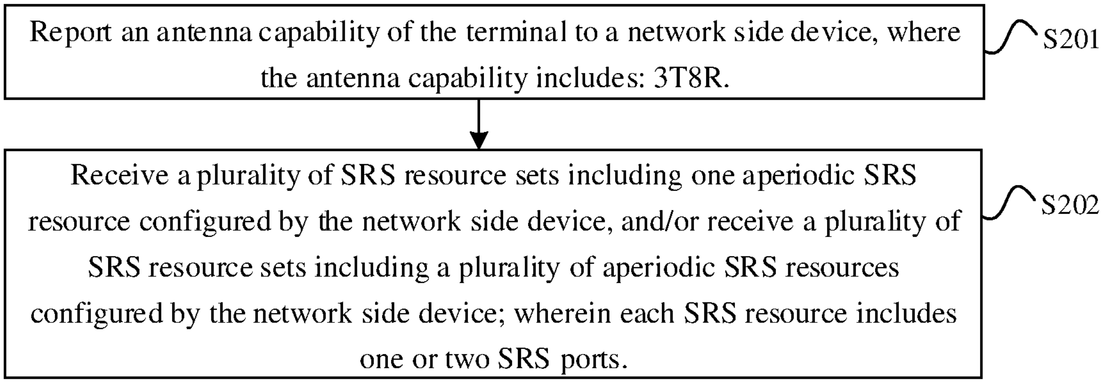
FIG. 20 is a flow chart of yet another resource configuration method provided by an embodiment of the present disclosure.

FIG. 20 is a flow chart of yet another resource configuration method provided by an embodiment of the present disclosure.

As shown in FIG. 20, the method is performed by a terminal. The method may include but is not limited to the following steps:

In S201, an antenna capability of the terminal is reported to a network side device. The antenna capability includes: 3T8R.

The antenna capability includes 3T8R, that is, the maximum number of layers for transmission is three layers (3T) and the maximum number of layers for receiving is eight layers (8R), which means that the terminal has the capability of transmitting up to three layers of data and the capability of receiving up to eight layers of data.

In S202, a plurality of SRS resource sets including one aperiodic SRS resource configured by the network side device are received, and/or a plurality of SRS resource sets including a plurality of aperiodic SRS resources configured by the network side device are received; wherein each SRS resource includes one or two SRS ports.

In the embodiment of the present disclosure, in a case where the antenna capability reported by the terminal includes 3T8R, the network side device configures a plurality of SRS resource sets for the terminal. The SRS resource set includes one or more SRS resources. The SRS resources may be aperiodic SRS resources.

It can be understood that in a case where the antenna capability reported by the terminal includes 3T8R, the terminal has at least eight antennas, three radio frequency transmitting channels, and eight radio frequency receiving channels.

Figure 21:
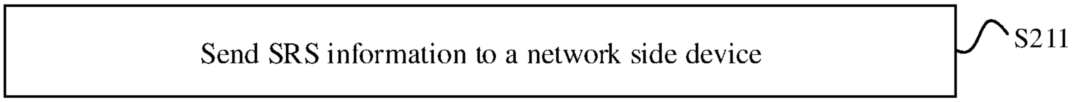
FIG. 21 is a flow chart of yet another resource configuration method provided by an embodiment of the present disclosure.

FIG. 21 is a flow chart of yet another resource configuration method provided by an embodiment of the present disclosure.

As shown in FIG. 21, the method is performed by a terminal. The method may include but is not limited to the following steps:

In S211, SRS information is sent to a network side device.

In the embodiment of the present disclosure, after the terminal reports its antenna capability to the network side device and the network side device configures at least one SRS resource set for the terminal based on the antenna capability reported by the terminal, the terminal sends the SRS information to the network side device according to the received SRS resource set, to inform the network side device to perform measurement of SRS.

It should be noted that S211 may be implemented alone or in combination with any other step in the embodiments of the present disclosure, for example, being implemented in combination with S121 and S122 and/or S131 and S132 and/or S141 and/or S151 and S152 and/or S161 and S162 and/or S171 and S172 and/or S181 and S182 and/or S191 and S192 and/or S201 and S202 in the embodiments of the present disclosure, and the embodiments of the present disclosure do not limit this.

FIG. 22 is a flow chart of yet another resource configuration method provided by an embodiment of the present disclosure.

As shown in FIG. 22, the method is performed by a terminal. The method may include but is not limited to the following steps:

In S221, in a case where the antenna capability reported by the terminal includes 3T4R, the terminal includes four antennas; two of the four antennas respectively use one radio frequency channel to transmit SRS information, and the remaining two antennas share one radio frequency channel to send the SRS information through switching.

In the embodiment of the present disclosure, in a case where the antenna capability reported by the terminal includes 3T4R, the terminal includes four antennas and three radio frequency transmitting channels, where two of the four antennas each use one radio frequency transmitting channel to transmit SRS information, and the other two antennas share one radio frequency transmitting channel to send the SRS information through switching.

In an example embodiment, as shown in FIG. 23, FIG. 23 is a circuit diagram of a 3T4R terminal transmitting SRS information provided by an embodiment of the present disclosure.

As shown in FIG. 23, in a case where the antenna capability reported by the terminal includes 3T4R, the terminal has at least four antennas (antenna 1, antenna 2, antenna 3, antenna 4 as shown in FIG. 23), three radio frequency transmitting channels (Tx1, Tx2, Tx3 as shown in FIG. 23) and four radio frequency receiving channels (see four Rxs in FIG. 23).

In an example embodiment, the network side device configures an SRS resource set. The SRS resource set includes four periodic SRS resources. Each of the four SRS resources has one port. Transmission of the four SRS resources are within a slot, and transmission of the four SRS resources may be performed by four antennas (antenna 1, antenna 2, antenna 3, antenna 4) respectively. For example, after the SRS information of three SRS resources are sent by antenna 1, antenna 3 and antenna 4 through Tx1, Tx2, and Tx3 respectively, Tx1 is switched to antenna 2, and the SRS information of one SRS resource is sent by antenna 2 through Tx1.

In another example embodiment, the network side device configures an SRS resource set. The SRS resource set includes three periodic SRS resources. Among the three SRS resources, one SRS resource has two ports, and each of the other two SRS resources has one port. The SRS information of the SRS resource with two ports may be sent by two antennas through two radio frequency transmitting channels. The SRS information of the other two SRS resources may be sent by the other two antennas through the other two radio frequency transmitting channels. Alternatively, the SRS resource set includes two periodic SRS resources. Among the two SRS resources, each SRS resource has two ports, and the SRS information of each SRS resource may be sent by two antennas through two radio frequency transmitting channels.

In the embodiment of the present disclosure, the network side device configures an SRS resource set. The SRS resource set may include four semi-persistent SRS resources, or the SRS resource set may include four aperiodic SRS resources, or the SRS resource set may include three semi-persistent SRS resources, or the SRS resource set may include three aperiodic SRS resources, or the SRS resource set may include two semi-persistent SRS resources, or the SRS resource set may include two aperiodic SRS resources, etc. Correspondingly, for the way for the terminal to send the SRS information of the SRS resource, reference may be made to the way in which the terminal sends the SRS information of the periodic SRS resource in the above examples, and repeated description is omitted here.

In another example embodiment, the network side device configures two SRS resource sets. The two SRS resource sets include four aperiodic SRS resources. The four SRS resources are sent in two slots. The four SRS resources are sent by four antennas (antenna 1, antenna 2, antenna 3, antenna 4) respectively. The two SRS resource sets may be as follows: each of the SRS resource sets has two aperiodic SRS resources, each SRS resource includes one port, and the SRS information of two aperiodic SRS resources in each SRS resource set is sent by two antennas through two radio frequency transmitting channels respectively; or, there is one aperiodic SRS resource in one SRS resource set, and there are three aperiodic SRS resources in the other SRS resource set, each resource includes one port, the SRS information of one aperiodic SRS resource in the one SRS resource set is sent by an antenna through a radio frequency transmitting channel, and the SRS information of the three aperiodic SRS resources in the other SRS resource set is transmitted by three antennas through three radio frequency transmitting channels.

The combinations of SRS resources and ports in the embodiments of the present disclosure may also be other combinations besides the above examples. For example, the network side device configures three SRS resource sets including one and/or a plurality of aperiodic SRS resources or the network side device configures four SRS resource sets including one and/or a plurality of aperiodic SRS resources, and so on, and embodiments of the disclosure do not specifically limit this.

It should be noted that in the above examples, the combinations of SRS resources and ports are only for illustration and do not limit the embodiments of the present disclosure. The combinations of SRS resources and ports in the embodiments of the present disclosure may also be other combinations besides the above examples, and embodiments of the present disclosure do not specifically limit this.

It should be noted that S231 may be implemented alone or in combination with any other step in the embodiments of the present disclosure, for example, being implemented in combination with S121 and S122 and/or S131 and S132 and/or S141 and/or S151 and S152 and/or S161 and S162 and/or S171 and S172 and/or S181 and S182 and/or S191 and S192 and/or S201 and S202 in the embodiments of the present disclosure, and the embodiments of the present disclosure do not limit this.

FIG. 24 is a flow chart of yet another resource configuration method provided by an embodiment of the present disclosure.

As shown in FIG. 24, the method is performed by a terminal. The method may include but is not limited to the following steps:

In S241, in a case where the antenna capability reported by the terminal includes 3T6R, the terminal includes six antennas; every two antennas among the six antennas share one radio frequency channel to send SRS information through switching.

In the embodiment of the present disclosure, in a case where the antenna capability reported by the terminal includes 3T6R, the terminal includes six antennas and three radio frequency transmitting channels, where every two antennas among the six antennas share one radio frequency transmitting channel to send SRS information through switching.

Figures 25, 26:
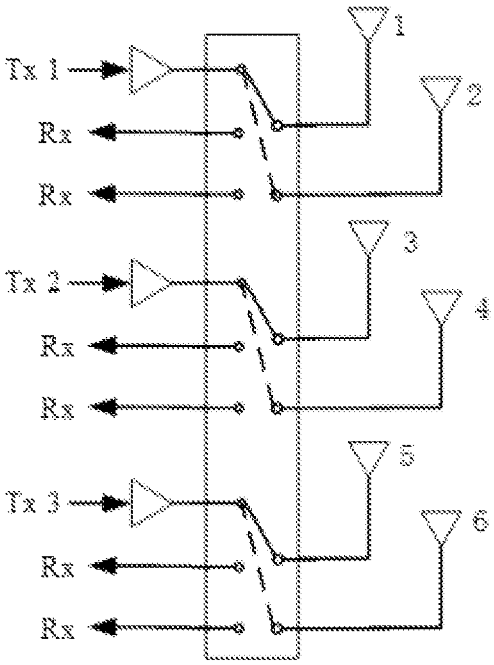
FIG. 25 is a radio frequency structural circuit diagram of a 3T6R terminal provided by an embodiment of the present disclosure.
FIG. 26 is a flow chart of yet another resource configuration method provided by an embodiment of the present disclosure.

In an example embodiment, as shown in FIG. 25, FIG. 25 is a circuit diagram of a 3T6R terminal transmitting SRS information provided by an embodiment of the present disclosure.

As shown in FIG. 25, in a case where the antenna capability reported by the terminal includes 3T6R, the terminal has at least six antennas (antenna 1, antenna 2, antenna 3, antenna 4, antenna 5, and antenna 6 shown in FIG. 25), three radio frequency transmitting channels (Tx1, Tx2, Tx3 shown in FIG. 25) and six radio frequency receiving channels (six Rxs shown in FIG. 25).

In an example embodiment, the network side device configures one SRS resource set. The one SRS resource set includes six periodic SRS resources. Each of the six SRS resources has one port. Transmission of the six SRS resources is in one slot. Transmission of the six SRS resources to the terminal is performed by six antennas (antenna 1, antenna 2, antenna 3, antenna 4, antenna 5, antenna 6) respectively. For example, the SRS information of three SRS resources among the six SRS resources is sent through three radio frequency transmitting channels (Tx1, Tx2, Tx3) by three antennas (antenna 1, antenna 3, antenna 5), and the SRS information of the other three SRS resources is sent through the three radio frequency transmitting channels (Tx1, Tx2, Tx3) by the other three antennas (antenna 2, antenna 4, antenna 6).

In another example embodiment, the network side device configures one SRS resource set, the one SRS resource set includes three periodic SRS resources, and each of the three SRS resources has two ports: or the network side device configures one SRS resource set, the one SRS resource set includes four periodic SRS resources, two of the four SRS resources each have two ports, and the other two SRS resources each have one port.

In an embodiment of the present disclosure, the network side device configures one SRS resource set. The SRS resource set may include six semi-persistent SRS resources, or the SRS resource set may also include six aperiodic SRS resources, or the SRS resource set may include three semi-persistent SRS resources, or the SRS resource set may include three aperiodic SRS resources, or the SRS resource set may include four semi-persistent SRS resources, or the SRS resource set may include four aperiodic SRS resources, etc. Correspondingly, for the way for the terminal to send SRS information on the SRS resources, reference may be made to the way in which the terminal sends the SRS information on the periodic SRS resources in the above examples, and repeated description is omitted here.

In another example embodiment, the network side device configures two SRS resource sets. The two SRS resource sets include six aperiodic SRS resources. The six SRS resources are sent in two slots. The SRS information of the six SRS resources is sent by six antennas (antenna 1, antenna 2, antenna 3, antenna 4, antenna 5, antenna 6) respectively. The two SRS resource sets may be as follows: each of the SRS resource sets has three aperiodic SRS resources, each SRS resource includes one port, and the SRS information of three aperiodic SRS resources in each SRS resource set is sent by three antennas through three radio frequency transmitting channels. Alternatively, the two SRS resource sets may be as follows: there are two aperiodic SRS resources in one SRS resource set, and there are four aperiodic SRS resources in the other SRS resource set, and each SRS resource includes one port.

In another example embodiment, the network side device configures three SRS resource sets including one and/or a plurality of aperiodic SRS resources, each SRS resource set includes one aperiodic SRS resource, and each SRS resource includes two ports, and three SRS resource sets are sent in three slots.

The combinations of SRS resources and ports in the embodiments of the present disclosure may also be other combinations besides the above examples. For example, the network side device configures four SRS resource sets including one and/or a plurality of aperiodic SRS resources, or the network side device configures five SRS resource sets including one and/or a plurality of aperiodic SRS resources, or the network side device configures six SRS resource sets including one and/or a plurality of aperiodic SRS resources, etc.

It should be noted that in the above examples, the combinations of SRS resources and ports are only for illustration and do not limit the embodiments of the present disclosure. The combinations of SRS resources and ports in the embodiments of the present disclosure can also be other combinations besides the above examples, and the embodiments of the present disclosure do not specifically limit this.

It should be noted that S241 may be implemented alone or in combination with any other step in the embodiments of the present disclosure, for example, being implemented in combination with S121 and S122 and/or S131 and S132 and/or S141 and/or S151 and S152 and/or S161 and S162 and/or S171 and S172 and/or S181 and S182 and/or S191 and S192 and/or S201 and S202 in the embodiments of the present disclosure, and the embodiments of the present disclosure do not limit this.

FIG. 26 is a flow chart of yet another resource configuration method provided by an embodiment of the present disclosure.

As shown in FIG. 26, the method is performed by a terminal. The method may include but is not limited to the following steps:

In S261, in a case where the antenna capability reported by the terminal includes 3T8R, the terminal includes eight antennas, and the eight antennas are divided into three antenna groups. Each antenna group includes at least two antennas. The at least two antennas in each antenna group share one radio frequency channel to send SRS information through switching.

In the embodiment of the present disclosure, in a case where the antenna capability reported by the terminal includes 3T8R, the terminal includes eight antennas and three radio frequency transmitting channels. The eight antennas are divided into three antenna groups. Each antenna group includes at least two antennas. The at least two antennas in each antenna group share one radio frequency transmitting channel to send SRS information through switching.

Figure 27:
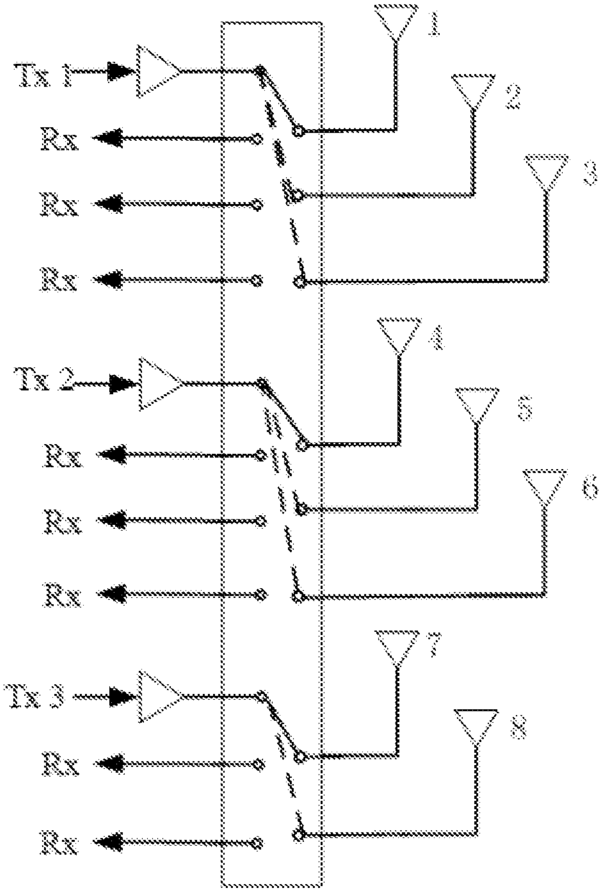
FIG. 27 is a radio frequency structural circuit diagram of a 3T8R terminal provided by an embodiment of the present disclosure.

In an example embodiment, as shown in FIG. 27, FIG. 27 is a circuit diagram of a 3T8R terminal transmitting SRS information provided by an embodiment of the present disclosure.

As shown in FIG. 27, in a case where the antenna capability reported by the terminal includes 3T8R, the terminal has at least eight antennas (antenna 1, antenna 2, antenna 3, antenna 4, antenna 5, antenna 6, antenna 7, antenna 8 shown in FIG. 27), three radio frequency transmitting channels (Tx1, Tx2, Tx3 shown in FIG. 27) and eight radio frequency receiving channels (eight Rxs shown in FIG. 27).

In an embodiment of the present disclosure, the network side device configures one SRS resource set. The one SRS resource set includes eight periodic SRS resources. Each of the eight SRS resources has one port. Transmission of the eight SRS resources is in one slot. Transmission of the SRS information on the eight SRS resources is performed respectively by eight antennas (antenna 1, antenna 2, antenna 3, antenna 4, antenna 5, antenna 6, antenna 7, antenna 8). For example, SRS information of three SRS resources is sent through three radio frequency transmitting channels (Tx1, Tx2, Tx3) by three antennas (antenna 1, antenna 4, antenna 7). SRS information of three SRS resources is sent through three radio frequency transmitting channels (Tx1, Tx2, Tx3) by three antennas (antenna 2, antenna 5, antenna 8). SRS information of the remaining two SRS resources is sent through two radio frequency transmitting channels (Tx1, Tx2) by two antennas (antenna 3, antenna 6).

Figure 28:
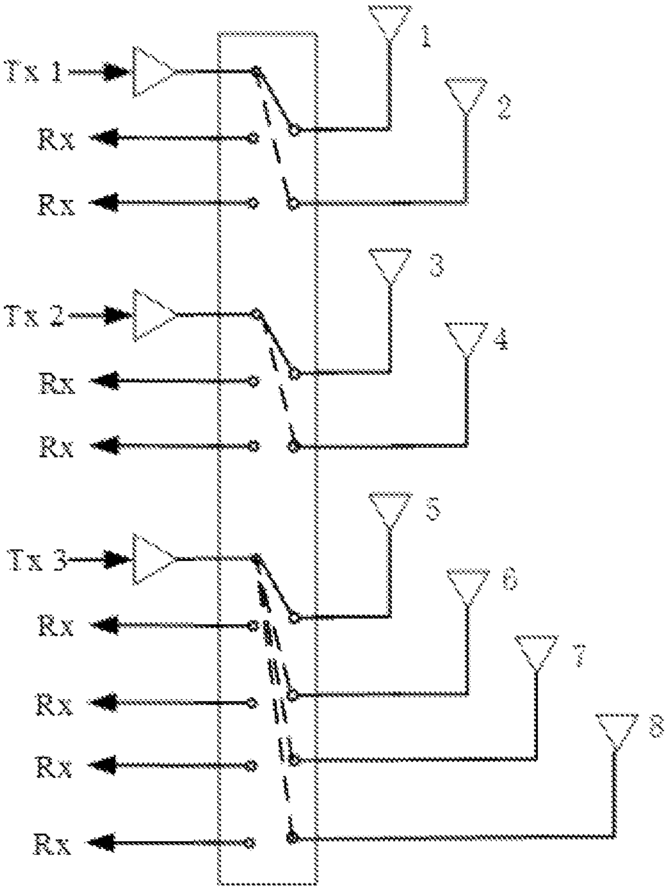
FIG. 28 is a radio frequency structure circuit diagram of another 3T8R terminal provided by an embodiment of the present disclosure.

In another example embodiment, as shown in FIG. 28, FIG. 28 is a circuit diagram of another 3T8R terminal transmitting SRS information provided by an embodiment of the present disclosure.

As shown in FIG. 28, in a case where the antenna capability reported by the terminal includes 3T8R, the terminal has at least eight antennas (antenna 1, antenna 2, antenna 3, antenna 4, antenna 5, antenna 6, antenna 7, antenna 8 shown in FIG. 28), three radio frequency transmitting channels (Tx1, Tx2, Tx3 shown in FIG. 28) and four radio frequency receiving channels (eight Rxs shown in FIG. 28).

In an embodiment of the present disclosure, the network side device configures one SRS resource set. The one SRS resource set includes eight periodic SRS resources. Each of the eight SRS resources has one port. Transmission of the eight SRS resources is in one slot. Transmission of the SRS information on eight SRS resources is performed respectively by eight antennas (antenna 1, antenna 2, antenna 3, antenna 4, antenna 5, antenna 6, antenna 7, antenna 8). For example, SRS information of three SRS resources is sent through three radio frequency transmitting channels (Tx1, Tx2, Tx3) by three antennas (antenna 1, antenna 3, antenna 5). SRS information of three SRS resources is sent through three radio frequency transmitting channels (Tx1, Tx2, Tx3) by three antennas (antenna 2, antenna 4, antenna 6). SRS information of the remaining two SRS resources is sent through one radio frequency transmitting channels (Tx3) by two other antennas (antenna 7, antenna 8).

In another example embodiment, the network side device configures one SRS resource set. The one SRS resource set includes four periodic SRS resources, and each of the four SRS resources has two ports; or the network side device configures one SRS resource set, the one SRS resource set includes six periodic SRS resources, two of the six SRS resources each have two ports, and the other four SRS resources each have one port.

In an embodiment of the present disclosure, the network side device configures one SRS resource set. The SRS resource set may include eight semi-persistent SRS resources, or the SRS resource set may include eight aperiodic SRS resources, or the SRS resource set may include four semi-persistent SRS resources, or the SRS resource set may include four aperiodic SRS resources, or the SRS resource set may include six semi-persistent SRS resources, or the SRS resource set may include six aperiodic SRS resources, etc. Correspondingly, for the way for the terminal to send SRS information on the SRS resources, reference may be made to the way in which the terminal sends the SRS information on the periodic SRS resources in the above examples, and repeated descriptions are omitted here.

In another example embodiment, the network side device configures two SRS resource sets. The two SRS resource sets include eight aperiodic SRS resources. Transmission of the eight SRS resources is in two slots. The transmission of the eight SRS resources is performed by eight antennas (antenna 1, antenna 2, antenna 3, antenna 4, antenna 5, antenna 6, antenna 7, antenna 8) respectively. The two SRS resource sets may be as follows: each SRS resource set has four aperiodic SRS resources, each SRS resource includes one port, and the four aperiodic SRS resources in each SRS resource set are sent through four radio frequency receiving channels by four antennas. Alternatively, the two SRS resource sets may be as follows: there are three aperiodic SRS resources in one SRS resource set, and there are five aperiodic SRS resources in the other SRS resource set, and each SRS resource includes one port.

In another example embodiment, the network side device configures four SRS resource sets, each SRS resource set includes one aperiodic SRS resource, each SRS resource includes two ports, and transmission of the four SRS resource sets is in four slots.

The combinations of SRS resources and ports in the embodiments of the present disclosure may also be other combinations besides the above examples. For example, the network side device configures five SRS resource sets including one and/or a plurality of aperiodic SRS resources; or the network side device configures six SRS resource sets including one and/or a plurality of aperiodic SRS resources; or the network side device configures seven SRS resource sets including one and/or a plurality of aperiodic SRS resources; or the network side device configures eight SRS resource sets including one and/or a plurality of aperiodic SRS resources, etc.

It should be noted that in the above examples, the combinations of SRS resources and ports are only for illustration and do not limit the embodiments of the present disclosure. The combinations of SRS resources and ports in the embodiments of the present disclosure may also be other combinations besides the above examples, and the embodiments of the present disclosure do not specifically limit this.

It should be noted that S261 may be implemented alone or in combination with any other step in the embodiments of the present disclosure, for example, being implemented in combination with S121 and S122 and/or S131 and S132 and/or S141 and/or S151 and S152 and/or S161 and S162 and/or S171 and S172 and/or S181 and S182 and/or S191 and S192 and/or S201 and S202 in the embodiments of the present disclosure, and the embodiments of the present disclosure do not limit this.

Figure 29:
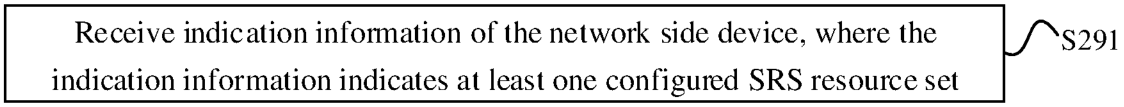
FIG. 29 is a flow chart of yet another resource configuration method provided by an embodiment of the present disclosure.

FIG. 29 is a flow chart of yet another resource configuration method provided by an embodiment of the present disclosure.

As shown in FIG. 29, the method is performed by a terminal. The method may include but is not limited to the following steps:

In S291, indication information of the network side device is received. The indication information indicates at least one configured SRS resource set.

In the embodiment of the present disclosure, after receiving the antenna capability reported by the terminal, the network side device configures for the terminal indication information corresponding to the antenna capability of the terminal, and the indication information indicates at least one configured SRS resource set.

In some embodiments, the indication information includes Radio Resource Control (RRC) signaling.

It should be noted that S291 may be implemented alone or may be implemented in combination with any other step in the embodiments of the present disclosure, for example, being implemented in combination with S121 and S122 and/or S131 and S132 and/or S141 and/or S151 and S152 and/or S161 and S162 and/or S171 and S172 and/or S181 and S182 and/or S191 and S192 and/or S201 and S202 and/or S211 and/or S221 and/or S241 and/or S261 in the embodiments of the present disclosure, and the embodiments of the present disclosure do not limit this.

In the above embodiments provided by the present disclosure, the methods provided by the embodiments of the present disclosure are introduced from the perspectives of the network side device and the terminal. In order to implement each function in the methods provided by the above embodiments of the present disclosure, the network side device and the terminal may include a hardware structure or a software module to implement the above functions in the form of a hardware structure, a software module, or a hardware structure plus a software module. A certain function among the above functions may be implemented by a hardware structure, a software module, or a hardware structure plus a software module.

Figure 30:
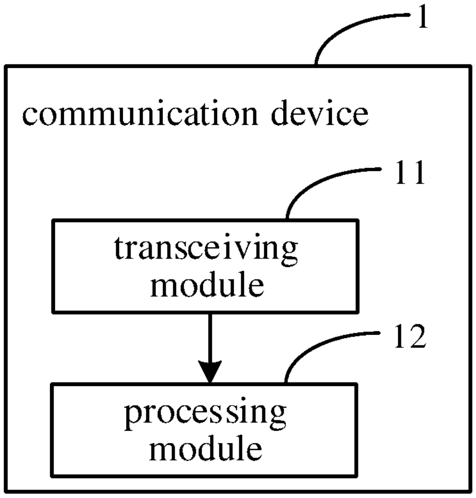
FIG. 30 is a structural diagram of a communication apparatus provided by an embodiment of the present disclosure.

FIG. 30 is a schematic structural diagram of a communication apparatus 1 provided by an embodiment of the present disclosure. The communication apparatus 1 shown in FIG. 30 may include a transceiving module 11 and a processing module 12. The transceiving module 11 may include a sending module and/or a receiving module. The sending module is configured to implement the sending function, and the receiving module is configured to implement the receiving function. The transceiving module 11 may implement the sending function and/or the receiving function.

The communication apparatus 1 may be a terminal, an apparatus in the terminal, or an apparatus that can be used in conjunction with the terminal. Alternatively, the communication apparatus 1 may be a network side device, an apparatus in the network side device, or an apparatus that can be used in conjunction with the network side device.

The communication apparatus 1 is a network side device;

The apparatus includes: a transceiving module 11 configured to receive an antenna capability reported by a terminal; wherein the antenna capability include that the maximum number of layers for transmission is greater than two layers; and a processing module 12 configured to configure at least one SRS resource set for the terminal according to the antenna capability reported by the terminal including that the maximum number of layers for transmission is greater than two layers.

The communication apparatus 1 is a terminal;

The apparatus includes: a transceing module 11 configured to report an antenna capability of the terminal to the network side device; wherein the antenna capability include that the maximum number of layers for transmission is greater than two layers; and a processing module 12 configured to receive at least one SRS resource set configured by the network side device.

Regarding the communication apparatus 1 in the above embodiments, the specific manner in which each module performs operations has been described in detail in the embodiments of the methods, and will not be described in detail here. The communication apparatus 1 provided in the above embodiments of the present disclosure can have the same or similar beneficial effects as the resource configuration methods provided in some of the above embodiments, and repeated descriptions will be omitted here.

Figure 31:
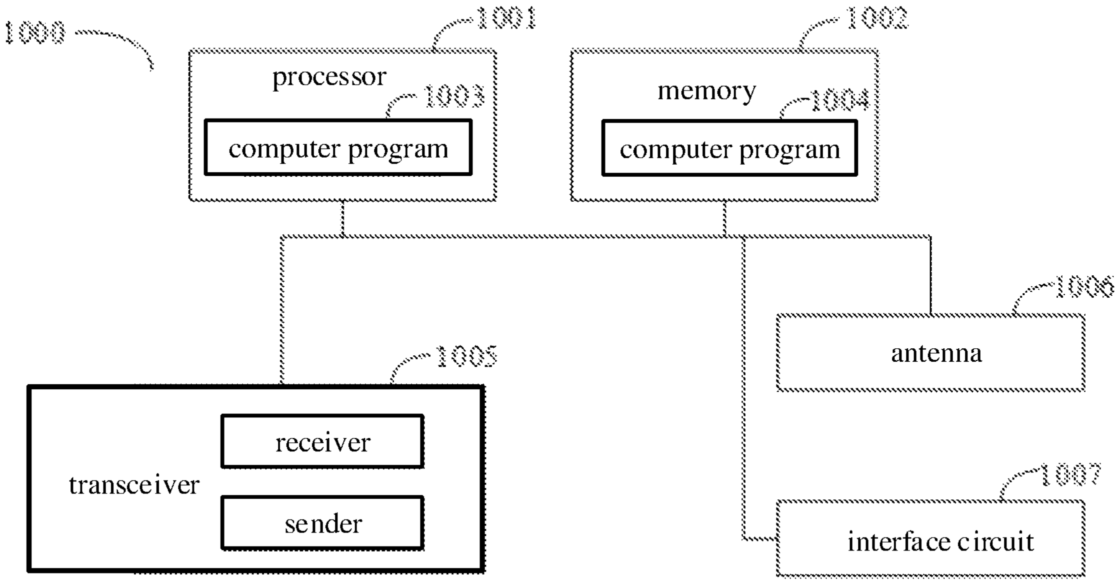
FIG. 31 is a structural diagram of another communication apparatus provided by an embodiment of the present disclosure.

FIG. 31 is a schematic structural diagram of another communication apparatus 1000 provided by an embodiment of the present disclosure. The communication apparatus 1000 may be a network side device, or a terminal, or a chip, a chip system or a processor that supports a network side device to implement the above methods, or a chip, a chip system or a processor that supports a terminal to implement the above methods, etc. The communication apparatus 1000 may be configured to implement the methods described in the above method embodiments. For details, reference may be made to the descriptions in the above method embodiments.

The communication apparatus 1000 may be a network side device, or a terminal, or a chip, a chip system or a processor that supports a network side device to implement the above methods, or a chip, a chip system or a processor that supports a terminal to implement the above methods, etc. The apparatus may be configured to implement the methods described in the above method embodiments. For details, reference may be made to the descriptions in the above method embodiments.

The communication apparatus may include one or more processors 1001. The processor(s) 1001 may be a general-purpose processor or a special-purpose processor, etc. For example, it can be a baseband processor or a central processor. The baseband processor may be used to process communication protocols and communication data, and the central processor may be used to control the communication apparatus (such as base station, baseband chip, terminal device, terminal device chip, DU or CU, etc.), executes a computer program, and processes data for a computer program.

Optionally, the communication apparatus 1000 may further include one or more memories 1002, on which a computer program 1004 may be stored, and the processor executes the computer program 1004, so that the communication apparatus 1000 performs the methods described in the above method embodiments. Optionally, data may also be stored in the memory 1002. The communication apparatus 1000 and the memory 1002 may be provided separately or integrated together.

Optionally, the communication apparatus 1000 may further include a transceiver 1005 and an antenna 1006. The transceiver 1005 may be called a transceiving unit, a transceiving device, or a transceiving circuit, etc., and is configured to realize sending and receiving functions. The transceiver 1005 may include a receiver and a sender. The receiver may be called a receiving device or a receiving circuit, etc., and is configured to realize the receiving function; the sender may be called a sending device or a sending circuit, etc., and is configured to realize the sending function.

Optionally, the communication apparatus 1000 may further include one or more interface circuits 1007. The interface circuits 1007 are configured to receive code instructions and transmit them to the processor 1001. The processor 1001 executes the code instructions to cause the communication apparatus 1000 to perform the methods described in the above method embodiments.

The communication apparatus 1000 is a network side device; the transceiver 1005 is configured to perform: S21 in FIG. 2; S31 in FIG. 3; S41 in FIG. 4; S51 in FIG. 5; S61 in FIG. 6; S71 in FIG. 7; S81 in FIG. 8; S91 in FIG. 9; S101 in FIG. 10; or S111 in FIG. 11; the processor 1001 is configured to perform; S22 in FIG. 2; S32 in FIG. 3; S52 in FIG. 5; S62 in FIG. 6; S72 in FIG. 7; S82 in FIG. 8; S92 in FIG. 9; or S102 in FIG. 10.

The communication apparatus 1000 is a terminal; the transceiver 1005 is configured to perform: S121 in FIG. 12; S131 in FIG. 13; S141 in FIG. 14; S151 in FIG. 15; S161 in FIG. 16; S171 in FIG. 17; S181 in FIG. 18; S191 in FIG. 19; S201 in FIG. 20; S211 in FIG. 21; S221 in FIG. 22; S241 in FIG. 24; S26 in FIG. 261; or S291 in FIG. 29; the processor 1001 is configured to perform; S122 in FIG. 12; S132 in FIG. 13; S152 in FIG. 15; S162 in FIG. 16; S172 in FIG. 17; S182 in FIG. 18; S192 in FIG. 19; or S202 in FIG. 20.

In one implementation, a transceiver for implementing receiving and sending functions may be included in the processor 1001. For example, the transceiver may be a transceiving circuit, or an interface, or an interface circuit. The transceiving circuit, interface or interface circuit configured to implement the receiving and sending functions may be separate or integrated together. The above-mentioned transceiving circuit, interface or interface circuit may be used for reading and writing of codes/data, or the above-mentioned transceiving circuit, interface or interface circuit may be used for signal transmission or delivery.

In one implementation, the processor 1001 may store a computer program 1003, and the computer program 1003 runs on the processor 1001, causing the communication apparatus 1000 to perform the methods described in the above method embodiments. The computer program 1003 may be solidified in the processor 1001, in which case the processor 1001 may be implemented in hardware.

In one implementation, the communication apparatus 1000 may include a circuit, and the circuit may implement the functions of sending or receiving or communicating in the foregoing method embodiments. The processor and transceiver described in the present disclosure may be implemented in Integrated Circuit (IC), analog IC, Radio Frequency Integrated Circuit (RFIC), mixed signal IC, Application Specific Integrated Circuit (ASIC), Printed Circuit Board (PCB), electronic device, and so on. The processor and transceiver may also be manufactured using various IC process technologies, such as Complementary Metal Oxide Semiconductor (CMOS), nMetal-Oxide-Semiconductor (NMOS), Positive Channel Metal Oxide Semiconductor (PMOS), Bipolar Junction Transistor (BJT), bipolar CMOS (BiCMOS), silicon germanium (SiGe), gallium arsenide (GaAs), etc.

The communication apparatus described in the above embodiments may be a terminal, but the scope of the communication apparatus described in the present disclosure is not limited thereto, and the structure of the communication apparatus is not limited by FIG. 31. The communication apparatus may be a stand-alone device or may be part of a larger device. For example, the communication apparatus may be:

(1) an independent integrated circuit (IC), or a chip, or a chip system or subsystem;
(2) a collection of one or more ICs; optionally, the IC collection may further include a storage component for storing data and computer programs;
(3) ASIC, such as modem;
(4) a module that can be embedded in other device(s);
(5) a receiver, a terminal device, an intelligent terminal device, a cellular phone, a wireless device, a handheld device, a mobile unit, a vehicle-mounted device, a network device, a cloud device, an artificial intelligence device, etc.;
(6) others, etc.

Figure 32:
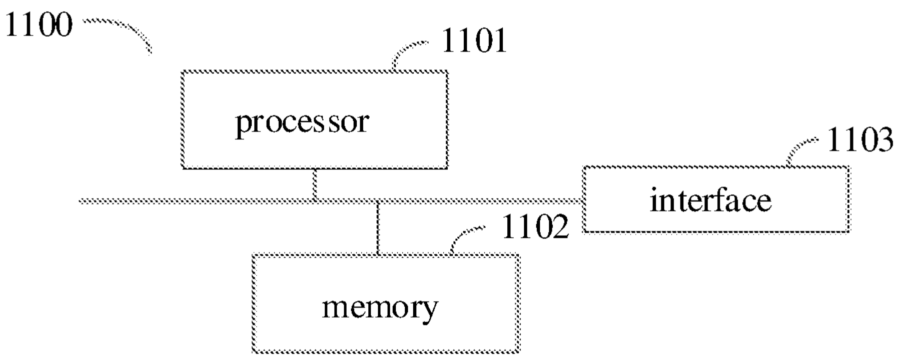
FIG. 32 is a schematic structural diagram of a chip provided by an embodiment of the present disclosure.

In a case where the communication apparatus may be a chip or a chip system referring to FIG. 32, FIG. 32 is a structural diagram of a chip provided by an embodiment of the present disclosure.

The chip 1100 may include at least one processor 1101 and at least one interface 1103. The number of processor(s) 1101 may be one or more, and the number of interface(s) 1103 may be more than one.

For a case where the chip is configured to implement the functions of the terminal in the embodiments of the present disclosure;

The interface 1103 is configured to receive code instructions and transmit them to the processor.

The processor 1101 is configured to run code instructions to perform the resource configuration methods described in some of the above embodiments.

For a case where the chip is configured to implement the functions of the network side device in the embodiments of the present disclosure;

The interface 1103 is configured to receive code instructions and transmit them to the processor.

The processor 1101 is configured to run code instructions to perform the resource configuration methods described in some of the above embodiments.

Optionally, the chip 1100 further includes a memory 1102, which is used to store necessary computer programs and data.

In the technical solutions of the present disclosure, the network side device can receive the antenna capability reported by the terminal; and, the antenna capability includes that the maximum number of layers for transmission is greater than two layers. Based on the antenna capability reported by the terminal including that the maximum number of layers for transmission is greater than two layers, the network side device configures at least one SRS resource set for the terminal. In this way, the antenna capability reported by the terminal includes that the maximum number of layers for transmission is greater than two, and the network side device can configure an SRS resource set for the terminal, thereby improving the performance of uplink transmission.

Those skilled in the art can also understand that the various illustrative logical blocks and steps listed in the embodiments of the present disclosure may be implemented by electronic hardware, computer software, or a combination of both. Whether such functionality is implemented in hardware or software depends on the specific application and overall system design requirements. Those skilled in the art can use various methods to implement the described functions for each specific application, but such implementation should not be understood as beyond the scope of protection of the embodiments of the present disclosure.

An embodiment of the present disclosure further provides a resource configuration system. The system includes a communication apparatus as a terminal and a communication apparatus as a network side device in the embodiment of FIG. 30. Alternatively, the system includes a communication apparatus as a terminal and a communication apparatus as a network side device in the embodiment of FIG. 31.

The present disclosure also provides a readable storage medium on which instructions are stored, and when the instructions are executed by a computer, the functions of any of the above method embodiments are implemented.

The present disclosure also provides a computer program product, which, when executed by a computer, implements the functions of any of the above method embodiments.

The above embodiments may be implemented in whole or in part by software, hardware, firmware, or any combination thereof. When implemented in software, the embodiments may be implemented in whole or in part in the form of a computer program product. The computer program product includes one or more computer programs. When the computer program is loaded and executed on a computer, processes or functions described in accordance with the embodiments of the present disclosure are generated in whole or in part. The computer may be a general-purpose computer, a special-purpose computer, a computer network, or other programmable device. The computer program may be stored in a computer-readable storage medium, or may be transferred from one computer-readable storage medium to another, for example, the computer program may be transferred from a website, computer, server, or data center to another website, computer, server or data center through wired (such as coaxial cable, optical fiber, Digital Subscriber Line (DSL)) or wireless (such as infrared, wireless, microwave, etc.) means. The computer-readable storage medium may be any available medium that can be accessed by a computer or a data storage device such as a server, data center, etc. that contains one or more available media integrated. The available medium may be magnetic medium (for example, floppy disk, hard disk, magnetic tape), optical medium (for example, high-density Digital Video Disc (DVD)), or semiconductor medium (for example, Solid State Disk (SSD)), etc.

Those of ordinary skill in the art can understand that first, second, and other numerical numbers involved in the present disclosure are only for convenience of description and are not used to limit the scope of the embodiments of the disclosure, nor to indicate a sequential order.

The term "at least one" in the present disclosure can also be described as one or a plurality of, and the plurality can be two, three, four or more, and the present disclosure is not limited thereto. In the embodiments of the present disclosure, for a kind of technical features, "first", "second", "third", "A", "B", "C" and "D", etc. are used to distinguish technical features in the kind of technical features, and technical features described associated with "first", "second", "third", "A", "B", "C" and "D" are in no particular sequential order or order of size.

The corresponding relationships shown in each table in the present disclosure can be configured or predefined. Value(s) of information in each table is (are) only examples and can be configured as other values, which is not limited by the present disclosure. When configuring a corresponding relationship between information and each parameter, it is not necessarily required to configure all the corresponding relationships shown in each table. For example, in a table in the present disclosure, a corresponding relationship shown in some rows may not be configured. For another example, appropriate modified adjustments can be made based on the above table, such as splitting, merging, etc. Names of parameters shown in titles of the tables may also be other names understandable by a communication apparatus, and values or expressions of parameters may also be other values or expressions understandable by the communication apparatus. When implementing the tables, other data structures can also be used, such as arrays, queues, containers, stacks, linear lists, pointers, linked lists, trees, graphs, structure bodies, classes, heaps, hash tables or lists, and so on.

Predefinition in the present disclosure may be understood as definition, definition in advance, storage, pre-storage, pre-negotiation, pre-configuration, solidification, or preburning.

Those of ordinary skill in the art will appreciate that the units and algorithm steps of each example described in conjunction with the embodiments disclosed herein can be implemented with electronic hardware, or a combination of computer software and electronic hardware. Whether these functions are performed in hardware or software depends on the specific application and design constraints of the technical solutions. Skilled artisans may implement the described functions using different methods for each specific application, but such implementations should not be considered to be beyond the scope of the present disclosure.

Those skilled in the art can clearly understand that for the convenience and simplicity of description, the specific working processes of the systems, apparatuses and units described above can be referred to the corresponding processes in the foregoing method embodiments, and will not be described again here.

The above are only example embodiments of the present disclosure, but the protection scope of the present disclosure is not limited thereto. Any person familiar with the technical field can easily think of changes or substitutions within the technical scope disclosed in the present disclosure, and such changes or substitutions fall within the protection scope of the present disclosure. Therefore, the protection scope of the present disclosure should be determined by the appended claims.

What is claimed is:

1. A resource configuration method, performed by a network side device, and the method comprising:

receiving an antenna capability reported by a terminal, wherein the antenna capability comprises that a maximum number of layers for transmission is three layers (3T); and configuring at least one Sounding Reference Signal (SRS) resource set for the terminal according to the antenna capability reported by the terminal;

wherein the antenna capability further comprises that: a maximum number of layers for receiving is four layers (4R), six layers (6R), or eight layers (8R);

wherein in case that the antenna capability reported by the terminal is 3T4R, the terminal comprises four antennas and three radio frequency transmitting channels, wherein two antennas in the four antennas respectively use one of the three radio frequency transmitting channels to transmit SRS information, and other two antennas in the four antennas share another one of the three radio frequency transmitting channels to send SRS information through switching;

wherein in case that the antenna capability reported by the terminal is 3T6R, the terminal comprises six antennas and three radio frequency transmitting channels, wherein every two antennas in the six antennas share one of the three radio frequency transmitting channels to send SRS information through switching; or wherein in case that the antenna capability reported by the terminal is 3T8R, the terminal comprises eight antennas and three radio frequency transmitting channels, wherein the eight antennas are divided into three antenna groups, each of the antenna groups comprises at least two antennas, and the at least two antennas in each of the antenna groups share one of the three radio frequency transmitting channels to send SRS information through switching.

2. The method according to claim 1, wherein in case that the antenna capability reported by the terminal is 3T4R, configuring the at least one SRS resource set for the terminal comprises one of:

configuring an SRS resource set comprising two periodic SRS resources for the terminal;

configuring an SRS resource set comprising two semi-persistent SRS resources for the terminal;

configuring an SRS resource set comprising two aperiodic SRS resources for the terminal;

configuring an SRS resource set comprising more than two periodic SRS resources for the terminal;

configuring an SRS resource set comprising more than two semi-persistent SRS resources for the terminal; or configuring an SRS resource set comprising more than two aperiodic SRS resources for the terminal, wherein each of the SRS resources comprises one or two SRS ports.

3. The method according to claim 1, wherein in case that the antenna capability reported by the terminal is 3T4R, configuring the at least one SRS resource set for the terminal comprises at least one of:

configuring a plurality of SRS resource sets each comprising an aperiodic SRS resource for the terminal; or configuring a plurality of SRS resource sets each comprising a plurality of aperiodic SRS resources for the terminal, wherein each of the SRS resources comprises one or two SRS ports.

4. The method according to claim 1, wherein in case that the antenna capability reported by the terminal is 3T6R, configuring the at least one SRS resource set for the terminal comprises one of:

configuring an SRS resource set comprising three periodic SRS resources for the terminal;

configuring an SRS resource set comprising three semi-persistent SRS resources for the terminal;

configuring an SRS resource set comprising three aperiodic SRS resources for the terminal;

configuring an SRS resource set comprising more than three periodic SRS resources for the terminal;

configuring an SRS resource set comprising more than three semi-persistent SRS resources for the terminal; or configuring an SRS resource set comprising more than three aperiodic SRS resources for the terminal, wherein each of the SRS resources comprises one or two SRS ports.

5. The method according to claim 1, wherein in case that the antenna capability reported by the terminal comprises is 3T6R, configuring the at least one SRS resource set for the terminal comprises at least one of:

configuring a plurality of SRS resource sets each comprising an aperiodic SRS resource for the terminal; or configuring a plurality of SRS resource sets each comprising a plurality of aperiodic SRS resources for the terminal, wherein each of the SRS resources comprises one or two SRS ports.

6. The method according to claim 1, wherein in case that the antenna capability reported by the terminal comprises 3T8R, configuring the at least one SRS resource set for the terminal comprises one of:

configuring an SRS resource set comprising four periodic SRS resources for the terminal;

configuring an SRS resource set comprising four semi-persistent SRS resources for the terminal;

configuring an SRS resource set comprising four aperiodic SRS resources for the terminal;

configuring an SRS resource set comprising more than four periodic SRS resources for the terminal;

configuring an SRS resource set comprising more than four semi-persistent SRS resources for the terminal; or configuring an SRS resource set comprising more than four aperiodic SRS resources for the terminal, wherein each of the SRS resources comprises one or two SRS ports.

7. The method according to claim 1, wherein in case that the antenna capability reported by the terminal is 3T8R, configuring the at least one SRS resource set for the terminal comprises at least one of:

configuring a plurality of SRS resource sets each comprising an aperiodic SRS resource for the terminal; or configuring a plurality of SRS resource sets each comprising a plurality of aperiodic SRS resources for the terminal, wherein each of the SRS resources comprises one or two SRS ports.

8. The method according to claim 1, wherein configuring the at least one SRS resource set for the terminal according to the antenna capability reported by the terminal comprises:

configuring, for the terminal, indication information corresponding to the antenna capability reported by the terminal, wherein the indication information indicates at least one configured SRS resource set.

9. The method according to claim 8, wherein the indication information comprises Radio Resource Control (RRC) signaling.

10. A resource configuration method, performed by a terminal, and the method comprising:

reporting an antenna capability of the terminal to a network side device, wherein the antenna capability comprises that a maximum number of layers for transmission is three layers (3T); and receiving at least one Sounding Reference Signal (SRS) resource set configured by the network side device;

wherein the antenna capability further comprises that: a maximum number of layers for receiving is four layers (4R), six layers (6R), or eight layers (8R);

wherein in case that the antenna capability reported by the terminal is 3T4R, the terminal comprises four antennas and three radio frequency transmitting channels wherein two antennas in the four antennas respectively use one of the three radio frequency transmitting channels to transmit SRS information, and other two antennas in the four antennas share another one of the three radio frequency transmitting channels to send SRS information through switching;

wherein in case that the antenna capability reported by the terminal is 3T6R, the terminal comprises six antennas and three radio frequency transmitting channels, wherein every two antennas in the six antennas share one of the three radio frequency transmitting channels to send SRS information through switching; or wherein in case that the antenna capability reported by the terminal is 3T8R, the terminal comprises eight antennas and three radio frequency transmitting channels, wherein the eight antennas are divided into three antenna groups, each of the antenna groups comprises at least two antennas, and the at least two antennas in each of the antenna groups share one of the three radio frequency transmitting channels to send SRS information through switching.

11. The method according to claim 10, wherein in case that the antenna capability is 3T4R, receiving the at least one SRS resource set configured by the network side device comprises one of:

receiving an SRS resource set comprising two periodic SRS resources configured by the network side device;

receiving an SRS resource set comprising two semi-persistent SRS resources configured by the network side device;

receiving an SRS resource set comprising two aperiodic SRS resources configured by the network side device;

receiving an SRS resource set comprising more than two periodic SRS resources configured by the network side device;

receiving an SRS resource set comprising more than two semi-persistent SRS resources configured by the network side device; or receiving an SRS resource set comprising more than two aperiodic SRS resources configured by the network side device, wherein each of the SRS resources comprises one or two SRS ports.

12. The method according to claim 10, wherein in case that the antenna capability is 3T4R, receiving the at least one SRS resource set configured by the network side device comprises at least one of:

receiving a plurality of SRS resource sets each comprising an aperiodic SRS resource configured by the network side device; or receiving a plurality of SRS resource sets each comprising a plurality of aperiodic SRS resources configured by the network side device, wherein each of the SRS resources comprises one or two SRS ports.

13. A communication apparatus, comprising:

a processor; and a memory storing a computer program executable by the processor, wherein the processor is configured to:

receive an antenna capability reported by a terminal, wherein the antenna capability comprises that a maximum number of layers for transmission is three layers (3T); and configure at least one Sounding Reference Signal (SRS) resource set for the terminal according to the antenna capability reported by the terminal;

wherein the antenna capability further comprises that: a maximum number of layers for receiving is four layers (4R), six layers (6R), or eight layers (8R);

wherein in case that the antenna capability reported by the terminal is 3T4R, the terminal comprises four antennas and three radio frequency transmitting channels, wherein two antennas in the four antennas respectively use one of the three radio frequency transmitting channels to transmit SRS information, and other two antennas in the four antennas share another one of the three radio frequency transmitting channels to send SRS information through switching;

wherein in case that the antenna capability reported by the terminal is 3T6R, the terminal comprises six antennas and three radio frequency transmitting channels, wherein every two antennas in the six antennas share one of the three radio frequency transmitting channels to send SRS information through switching; or wherein in case that the antenna capability reported by the terminal is 3T8R, the terminal comprises eight antennas and three radio frequency transmitting channels, wherein the eight antennas are divided into three antenna groups, each of the antenna groups comprises at least two antennas, and the at least two antennas in each of the antenna groups share one of the three radio frequency transmitting channels to send SRS information through switching.

14. A communication apparatus, comprising:

a processor; and a memory storing a computer program executable by the processor, wherein the processor is configured to perform the method of claim 10.

15. A non-transitory computer-readable storage medium configured to store instructions, wherein when the instructions are executed by a processor, the processor is caused to perform the method according to claim 1.

16. A non-transitory computer-readable storage medium configured to store instructions, wherein when the instructions are executed by a processor, the processor is caused to perform the method according to claim 10.

* * * * *